United States Patent
Tanaka et al.

(10) Patent No.: US 10,275,398 B2
(45) Date of Patent: Apr. 30, 2019

(54) CONTENT DISPLAY DEVICE, CONTENT DISPLAY METHOD, AND CONTENT DISPLAY PROGRAM

(71) Applicant: Nippon Telegraph and Telephone Corporation, Tokyo (JP)

(72) Inventors: Kiyoshi Tanaka, Kanagawa-ken (JP); Yasuhiko Miyazaki, Kanagawa-ken (JP); Tetsuro Tokunaga, Kanagawa-ken (JP); Mutsuhiro Nakashige, Kanagawa-ken (JP)

(73) Assignee: Nippon Telegraph and Telephone Corporation (JP)

( * ) Notice: Subject to any disclaimer, the term of this patent is extended or adjusted under 35 U.S.C. 154(b) by 301 days.

(21) Appl. No.: 14/426,552

(22) PCT Filed: Sep. 10, 2013

(86) PCT No.: PCT/JP2013/074413
§ 371 (c)(1),
(2) Date: Mar. 6, 2015

(87) PCT Pub. No.: WO2014/042158
PCT Pub. Date: Mar. 20, 2014

(65) Prior Publication Data
US 2015/0227566 A1    Aug. 13, 2015

(30) Foreign Application Priority Data

Sep. 11, 2012  (JP) .................................. 2012-199135
Feb. 6, 2013   (JP) .................................. 2013-021313

(51) Int. Cl.
*G06F 16/9538*   (2019.01)
*G06F 16/9532*   (2019.01)
(Continued)

(52) U.S. Cl.
CPC ........ *G06F 16/2246* (2019.01); *G06F 16/951* (2019.01); *G06F 16/954* (2019.01); *G06F 16/9577* (2019.01)

(58) Field of Classification Search
CPC ......... G06F 17/30905; G06F 17/30873; G06F 17/30864; G06F 17/30327
See application file for complete search history.

(56) References Cited

U.S. PATENT DOCUMENTS 5,933,826 A * 8/1999 Ferguson ................ G06F 21/31
6,438,540 B2 * 8/2002 Nasr .................. G06F 17/30569
(Continued)

FOREIGN PATENT DOCUMENTS

JP    2001-236283 A    8/2001
JP    2002-149640 A    5/2002
(Continued)

OTHER PUBLICATIONS

EP1927922; European Patent; Published Apr. 6, 2008.*
(Continued)

*Primary Examiner* — Daniel A Kuddus
(74) *Attorney, Agent, or Firm* — Kilpatrick Townsend & Stockton LLP

(57) ABSTRACT

A content display device includes a content acquisition unit configured to acquire content data including a script, a storage unit configured to expand the content data into tree-structure data and store the tree-structure data, a determination unit configured to determine from the tree-structure data a sub-tree corresponding to a portion of the digital content to be displayed by each of the plurality of child browsers, and transmit the sub-tree to the corresponding child browser, an execution unit configured to execute the script, and an access unit configured to, when the execution unit executes a process to access the tree-structure data,
(Continued)

```
<html>
<head>
  <title>Sample</title>
  <script type="text/javascript" src="Sample.js"></script>
</head>
<body onload="init()">
  <div id="dv" device="TV">
    <h1 id="hlv">Video</h1>
    <div id="player">
      <video id="video" src="video/A1.mp4"></video>
    </div>
  </div>
  <div id="dc" device="phone">
    <h1 id="hlc">Control</h1>
    <select name="sel" id="sel">
      <option value="0">Movie1</option>
      <option value="1">Movie2</option>
      <option value="2">Movie3</option>
      <option value="3">Movie4</option>
    </select>
  </div>
</body>
</html>
``` notify the child browser holding a sub-tree to be accessed of the process and cause the child browser to execute a process, and configured to, when an occurrence notice of an event is received from the child browser, cause the execution unit to execute a process corresponding to the event.

10 Claims, 25 Drawing Sheets

(51) Int. Cl.
*G06F 16/22* (2019.01)
*G06F 16/951* (2019.01)
*G06F 16/957* (2019.01)
*G06F 16/954* (2019.01)

(56) References Cited

U.S. PATENT DOCUMENTS

| | | | | |
|---|---|---|---|---|
| 7,337,392 | B2* | 2/2008 | Lue | G06F 17/30905 |
| | | | | 707/E17.121 |
| 7,712,025 | B2* | 5/2010 | Roessler | G06F 17/30899 |
| | | | | 711/118 |
| 8,375,086 | B2* | 2/2013 | Flavin | G06Q 10/10 |
| | | | | 709/205 |
| 2002/0083098 | A1* | 6/2002 | Nakamura | G06F 17/30873 |
| | | | | 715/234 |
| 2004/0044963 | A1 | 3/2004 | Uchiyama et al. | |
| 2004/0122971 | A1* | 6/2004 | Joshi | H04L 29/06 |
| | | | | 709/236 |
| 2004/0123239 | A1* | 6/2004 | Roessler | G06F 17/30899 |
| | | | | 715/744 |
| 2007/0288854 | A1* | 12/2007 | Koskimies | G06F 9/451 |
| | | | | 715/760 |
| 2008/0139191 | A1* | 6/2008 | Melnyk | G06F 17/30905 |
| | | | | 455/419 |
| 2008/0282150 | A1* | 11/2008 | Erwin | G06F 17/3089 |
| | | | | 715/255 |
| 2009/0037517 | A1 | 2/2009 | Frei | |
| 2009/0077091 | A1* | 3/2009 | Khen | G06F 8/20 |
| 2009/0081950 | A1* | 3/2009 | Matsubara | H04H 60/80 |
| | | | | 455/3.06 |
| 2009/0164987 | A1* | 6/2009 | Scholz | G06F 9/542 |
| | | | | 717/168 |
| 2010/0081607 | A1* | 4/2010 | Varineau | C11D 1/722 |
| | | | | 510/405 |
| 2012/0081607 | A1* | 4/2012 | Kitazato | H04N 21/43615 |
| | | | | 348/552 |
| 2012/0290917 | A1* | 11/2012 | Melnyk | G06F 17/30905 |
| | | | | 715/234 |
| 2012/0290919 | A1* | 11/2012 | Melnyk | G06F 17/30905 |
| | | | | 715/234 |
| 2013/0016858 | A1 | 1/2013 | Masaki et al. | |

FOREIGN PATENT DOCUMENTS

| | | |
|---|---|---|
| JP | 2004-046642 A | 2/2004 |
| JP | 2006-195675 A | 7/2006 |
| JP | 2007-116669 A | 5/2007 |
| JP | 2009-080593 A | 4/2009 |
| JP | 2010-503127 A | 1/2010 |
| WO | 2008/030976 A2 | 3/2008 |
| WO | 2011/125831 A1 | 10/2011 |
| WO | 2012/043353 A1 | 4/2012 |

OTHER PUBLICATIONS

Maekawa, A Collaborative Web Browsing System for Multiple Mobile Users by Using Web Page Splitting, IPSJ SIG Techical Reports, vol. 2004, No. 114, Information Processing Society of Japan, Nov. 12, 2014, 2004th Volume, pp. 1-7.
Office Action, Japanese Patent Application No. 2015-203914, dated Sep. 13, 2016.
Office Action, Japanese Patent Application No. 2014-535555, dated Aug. 18, 2015.
International Preliminary Report on Patentability, PCT Application No. PCT/JP2013/074413, dated Mar. 26, 2015.
Motegi et al., Second Screen Displaying Life Logs and TV-Contents Information, IEICE Tech. Rep., LOIS2011-9, pp. 1-5, Jul. 2011.
International Search Report, PCT Patent Application No. PCT/JP2013/074413, dated Dec. 17, 2013.

* cited by examiner

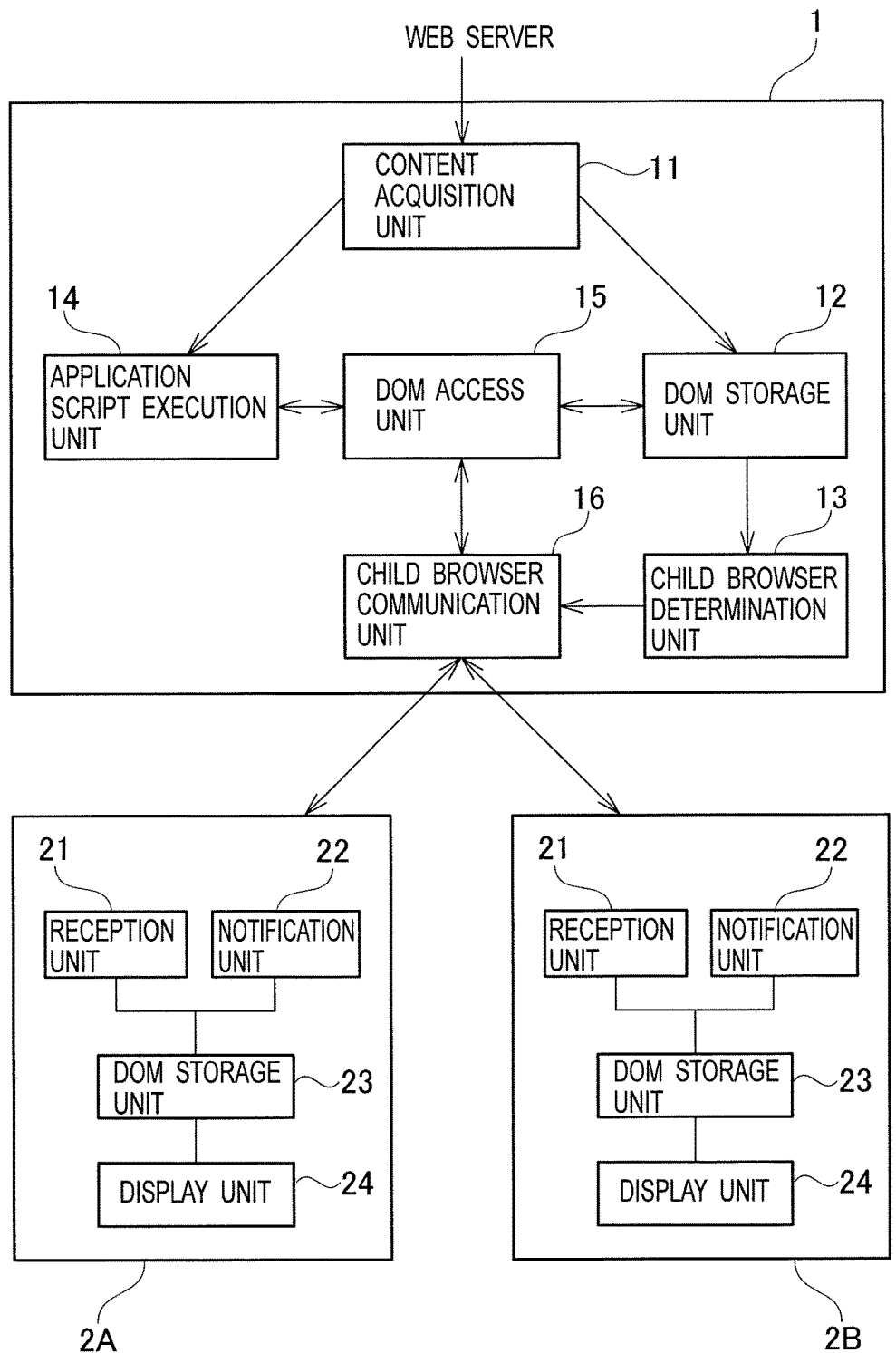

FIG. 2

```
<html>
<head>
  <title>Sample</title>
  <script type="text/javascript" src="Sample.js"></script>
</head>
<body onload="init()">
  <div id="dv" device="TV">
    <h1 id="h1v">Video</h1>
    <div id="player">
      <video id="video" src="video/A1.mp4"></video>
    </div>
  </div>
  <div id="dc" device="phone">
    <h1 id="h1c">Control</h1>
    <select name="sel" id="sel">
      <option value="0">Movie1
      <option value="1">Movie2
      <option value="2">Movie3
      <option value="3">Movie4
    </select>
  </div>
</body>
</html>
```

FIG. 3

```
function init(){
  var video = document.getElementById("video");
  var sel = document.getElementById("sel");

sel.addEventListener('change', changeVideo);

var movies = [ "video/A1.mp4", "video/A2.mp4", "video/A3.mp4", "video/A4.mp4" ];

function changeVideo(e){
    var idx = sel.selectedIndex;
    var src = movies[idx];
    video.src = src;
    video.load();
    video.play();
  }
}
```

Video

Control

Movie1 ▼

FIG. 11

```
<html>
<head>
<title>Sample</title>
<script>
function act_post(){
    $('proposal').appendTo($('#list'))
}
</script>
</head>
<body>
<div id="db" device="BigScreen">
    <h1 id="h1a">All topics</h1>
    <div id="list"> </div>
</div>
<div id="dp" device="PersonalTerminal">
    <h1 id="h1p">Propose Topics</h1>
    <div id="proposal">What is goal?</div>
    <button type="button" name="act" value="Post" onClick="act_post()" />
</div>
</body>
</html>
```

FIG. 15

```
<html>
<head>
<title>Sample</title>
<script>
function act_post(){
    $('proposal').appendTo($('#list'))
}
</script>
</head>
<body>
<div id="db" device="BigScreen">
<h1 id="h1a">All topics</h1>
<div id="list">
<div id="proposal">What is goal?</div>
</div>
</div>
<div id="dp" device="PersonalTerminal">
<h1 id="h1p">Propose Topics</h1>
<button type="button" name="act" value="Post" onClick="act_post()" />
</div>
</body>
</html>
```

FIG. 17

All Topics
What is goal?

FIG. 18

Propose Topics
[Post]

FIG. 19

```
<html>
<head>
<title>Sample</title>
</head>
<body>
<div id="dv" device="TV">
 <h1 id="h1v">Video</h1>
 <video id="video" src="video/bm1.m4p"></video>
</div>
<div id="dp" device="phone">
 <h1 id="h1c">Control</h1>
 <button type="button" name="act" value="Play" onClick="video.play()" />
<div id="dt" device="tablet">
 <h1 id="h1i">Information</h1>
 <div id="info_ti">Title : Business manner #1</div>
 </div>
</body>
</html>
```

Video

Video

US 10,275,398 B2

CONTENT DISPLAY DEVICE, CONTENT DISPLAY METHOD, AND CONTENT DISPLAY PROGRAM

This application is a national stage application of PCT/JP2013/074413, which claims priority to Japanese Publications Nos. 2012-199135 and 2013-021313, all of which are incorporated herein by reference.

TECHNICAL FIELD

The present invention relates to a technology of displaying a digital content on a plurality of devices in a cooperative manner.

BACKGROUND ART

In recent years, information provision technologies via communication networks have been evolving considerably through a series of technologies called Web technology. In information provision with the Web technology, a digitalized content is delivered via a communication network in a format called HTML (Hyper Text Markup Language), and software called a Web browser displays the content to users, and receives user manipulations. The Web browser mainly performs operations as described below.

1. The Web browser converts HTML data into tree-structure data called a DOM (Document Object Model) format.

2. The Web browser displays the data on the screen by applying display designs to elements in the DOM based on CSS (Cascading Style Sheets) data.

3. With a script language called JavaScript (Registered Trademark) (which is also called ECMAscript), the Web browser interacts with users or makes a dynamic change to the screen, by dynamically performing DOM operations (element generation/deletion/movement, attribute setting/reference, property setting/reference, method call, and the like) in an initial display and on the occurrence of various types of events (pointer manipulation, keyboard entry, and clicking on elements on the DOM such as a button and the like which are performed by users, timer, reception of asynchronous communications, and the like).

As described above, HTML data, JavaScript codes and CSS data integrally to constitute digital content data.

The Web technology has been implemented very often as the information provision technology, and libraries or tools for facilitating use of the Web technology are widely known. For example, use of the library released as JQuery enables simple implementation of JavaScript for executing DOM operation processes or performing setting of processes on events.

In addition, technologies for delivering a digital content to a plurality of devices through the use of the Web technology have been developed. For example, Non-Patent Document 1 discloses a technique by which in conjunction with a video content displayed on a television receiver, a related content is displayed on a tablet terminal by operating Web browsers on the television receiver and the tablet terminal. The technique of operating the Web browsers cooperatively is described with reference to FIG. 34. HTML data including video elements for playing motion video is delivered to a Web browser 100A operating on a television receiver, while HTML data including elements for displaying related information is delivered to a Web browser 100B operating on a tablet terminal. JavaScript for communicating necessary information via a WebSocket server 200 is prepared in the HTML data to be delivered to the Web browsers 100A, 100B. The Web browser 100A transmits to the WebSocket server 200 metadata which is embedded in motion video in accordance with motion video to be played. The WebSocket server 200 transmits to the Web browser B information related to the received metadata. Then, the information related to the motion video to be played is displayed on the Web browser 100B.

CITATION LIST

Non Patent Literature

NPL 1: Motegi and two others, "Second screen displaying life logs and TV-contents information", IEICE Tech. Rep., LOIS2011-9, pp. 1-5, July 2011.

SUMMARY OF THE INVENTION

Problem to be Solved by the Invention

The conventional method to deliver a digital content to a plurality of devices cooperatively, however, has a problem that digital content data such as HTML data and JavaScript needs to be created for individual devices, which is burdensome to information providers. In the example of FIG. 34, digital content data needs to be prepared separately for the Web browser 100A configured to play motion video and the Web browser 100B configured to receive and display information related to the motion video. When two or more pieces of digital content data are involved, JavaScript cannot easily refer to an HTML data element contained in a different piece of digital content data because JavaScript execution spaces are different. Thus, when a digital content to be provided by a plurality of devices cooperatively is provided, digital content data need to be prepared separately for each device even though conceptually it is a single digital content data. In addition, there is a problem that an inter-device cooperation mechanism must be considered. On the one hand, when a digital content to be used in one device such as a normal Web browser and the like is provided, only one piece of digital content data has to be prepared, and a conventional library or tool and the like can be used.

The present invention has been made in light of the above, and an objective of the present invention is to divide digital content data and display the content data on a plurality of devices.

Means for Solving the Problem

A first feature of the present invention is summarized as a content display device which causes a plurality of child browsers to display a digital content, the content display device including: a content acquisition unit configured to acquire content data including a script; a storage unit configured to expand the content data into tree-structure data and store the tree-structure data; a determination unit configured to determine from the tree-structure data a sub-tree corresponding to a portion of the digital content to be displayed by each of the plurality of child browsers, and transmit the sub-tree to the corresponding child browser; an execution unit configured to execute the script; an access unit configured to, when the execution unit executes a process to access the tree-structure data, notify the child browser holding a sub-tree to be accessed of the process and cause the child browser to execute a process, and configured to, when an occurrence notice of an event is received from the child browser, cause the execution unit to execute a process corresponding to the event; and a communication unit configured to communicate with the child browsers.

A second feature of the present invention is summarized as a content display system in which a content display device causes a plurality of child browsers to display a digital content. Here, the content display device includes: a content acquisition unit configured to acquire content data including a script; a storage unit configured to expand the content data into tree-structure data and store the tree-structure data; a determination unit configured to determine from the tree-structure data a sub-tree corresponding to a portion of the digital content to be displayed by each of the plurality of child browsers, and configured to transmit the sub-tree to the corresponding child browser; an execution unit configured to execute the script; an access unit configured to when the execution unit executes a process to access the tree-structure data, notify the child browser holding a sub-tree to be accessed of the process, and configured to cause the execution unit to execute a process corresponding to an event when an occurrence notice of the event is received from the child browser; and a communication unit configured to communicate with the child browsers. Each of the child browsers includes: a storage unit configured to receive and store the sub-tree; a display unit configured to display a screen based on the sub-tree and accept a manipulation; a reception unit configured to receive the notice from the content display device and access the sub-tree based on the notice; and a notification unit configured to notify the content display device of an occurrence notice of an event when the event occurs in the sub-tree.

A third feature of the present invention is summarized as a data structure of content data to be acquired by a content display device which causes a plurality of child browsers to display a digital content. Here, elements which constitute the digital content are arranged in a tree structure, and in an element which is a root of a sub-tree transmitted to each of the plurality of child browsers, an attribute value corresponding to the child browser is set.

A fourth feature of the present invention is summarized as a content display method of causing a plurality of child browsers to display a digital content, including: acquiring content data including a script; expanding the content data into tree-structure data and storing the tree-structure data; determining from the tree-structure data a sub-tree corresponding to a portion of the digital content to be displayed by each of the plurality of child browsers and transmitting the sub-tree to the corresponding child browser; executing the script; when a process to access the tree-structure data is executed in the executing the script, notifying the child browser holding a sub-tree to be accessed of the process, and causing the child browser to execute a process; executing a process corresponding to an event when an occurrence notice of the event is received from any of the child browsers; and communicating with the child browsers.

A fifth feature of the present invention is summarized as a content display method in which a content display device causes a plurality of child browsers to display a digital content, the content display method by the content display device including: acquiring content data including a script; expanding the content data into tree-structure data and storing the tree-structure data; determining from the tree-structure data a sub-tree corresponding to a portion of the digital content to be displayed by each of the plurality of child browsers and transmitting the sub-tree to the corresponding child browser; executing the script; when a process to access the tree-structure data is executed in the step of executing the script, notifying the child browser holding the sub-tree to be accessed of the process, and causing the child browser to execute a process; executing a process corresponding to an event when an occurrence notice of the event is received from the child browser; and communicating with the child browsers, and the content display method by the child browser including: receiving and storing the sub-tree; displaying a screen based on the sub-tree and accepting a manipulation; receiving the notice from the content display device and accessing the sub-tree based on the notice; and notifying the content display device of an occurrence notice of an event when the event occurs in the sub-tree.

A sixth feature of the present invention is summarized as a content display program which causes a computer to operate as a content display device or a child browser.

Effect of the Invention

According to the present invention, digital content data can be divided and displayed on a plurality of devices.

BRIEF DESCRIPTION OF THE DRAWINGS

FIG. 1 is an overall configuration diagram including a content display device according to a first embodiment.

FIG. 2 is a view showing an example of HTML data to be acquired by the content display device.

FIG. 3 is a view showing an example of JavaScript codes to be acquired by the content display device.

FIG. 11 is a view showing HTML data to be acquired by a content display device in a second embodiment.

FIG. 15 is a view showing HTML data after being changed.

FIG. 17 is a view showing a display example of the sub-tree after being changed.

FIG. 18 is a view showing a display example of another sub-tree after being changed.

FIG. 19 is a view showing an example of HTML data to be acquired by a content display device in a third embodiment.

Figure 4:
FIG. 4 is a view showing an example in which the digital content is displayed in a single browser.

MODE FOR CARRYING OUT THE INVENTION (First Embodiment)

In the following, a first embodiment is described with reference to drawings.

[First Embodiment]

FIG. 1 is an overall configuration diagram including a content display device in this embodiment. The content display device 1 acquires digital content data from a Web server, divides the acquired content data, transmits the data to each of child browsers 2A, 2B, and causes each of the child browsers 2A, 2B to display a portion of the digital content. The content display device 1 as shown in FIG. 1 include a content acquisition unit 11, a DOM storage unit 12, a child browser determination unit 13, an application script execution unit 14, a DOM access unit 15, and a child browser communication unit 16. A computer with an arithmetic processing unit, a storage device and the like may constitute each unit which the content display device 1 includes, and processing of each unit may be executed by a program. The program is stored in a storage device which the content display device 1 includes, and can be recorded in a recording medium such as a magnetic disk, an optical disc, a semiconductor memory and the like or provided through a network. Each unit of the content display device 1 is described in the following.

The content acquisition unit 11 is connected to the Web server and downloads digital content data with a well-known protocol such as an HTTP and the like. Digital content data may be in any format as far as the data can be expanded into a tree data structure through processing of the DOM storage unit 12 to be described below. In addition, digital content data used in the present invention may be digital content data created in a format originally intended for use in one device (or one browser). When digital content data is created in the HTML, the digital content data includes HTML data, JavaScript codes and CSS data, for example, integrally constitute a digital content. While there are some cases in which JavaScript codes and CSS data are written in HTML data, different files may be specified to acquire JavaScript codes and CSS data from other data sources. For example, some content data specifies a data source by a link tag such as <link rel="stylesheet" href="style.css" type="text/css"> or specifies a data source by a src attribute such as <script type="text/javascript" src="script.js"></script>. When different files are specified, the content acquisition unit 11 acquires data including these files. Of digital content data acquired by the content acquisition unit 11, JavaScript codes specified by script tags are sent to the application script execution unit 14 and other data is sent to the DOM storage unit 12.

FIG. 2 shows an example of HTML data. FIG. 3 shows an example of JavaScript codes. FIG. 4 shows an example of displaying a digital content of FIG. 2 and FIG. 3 in a single browser. The digital content data shown by FIG. 2 and FIG. 3 displays motion video selected with a select box. When the content display device 1 in this embodiment is used, display of the motion video and display of the select box are distributed to child browsers 2A, 2B. One child browser 2A displays the motion video, while another child browser 2B displays the select box to receive selection of the motion video.

Figure 5:
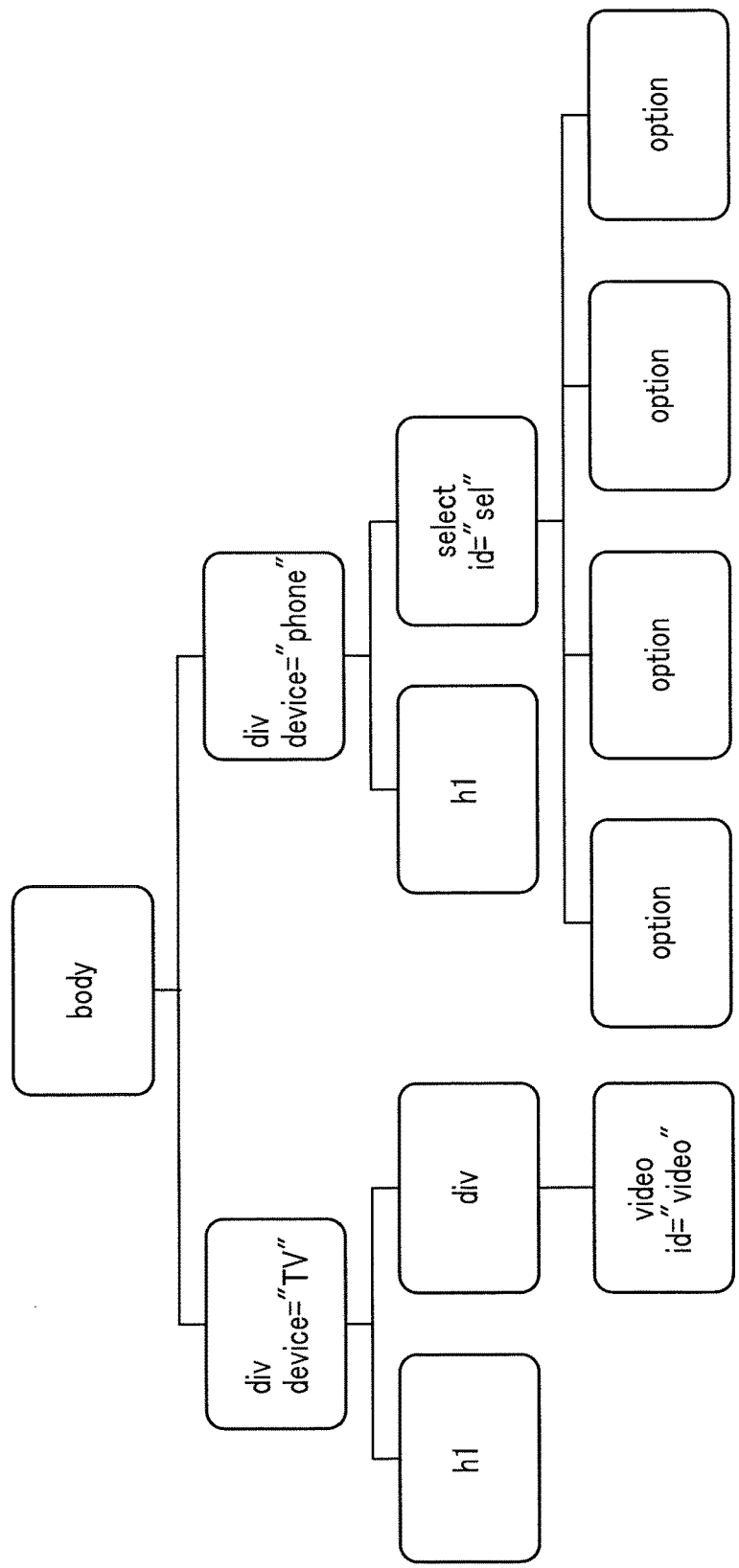
FIG. 5 is a view showing a DOM tree structure converted from the HTML data.

The DOM storage unit 12 analyzes the HTML data acquired by the content acquisition unit 11, expands the data into a DOM, which is a tree-like data structure, and stores the data. The DOM storage unit 12 also stores CSS data acquired by the content acquisition unit 11. FIG. 5 shows a DOM tree structure converted from the HTML data in FIG. 2. Each square frame in FIG. 5 represents a DOM element. As shown in FIG. 2 and FIG. 5, one tag of the HTML data constitutes one element, and a part enclosed by tags is a child element. Note that FIG. 5 lists attributes necessary for explanation, and not all attributes.

In addition, the DOM storage unit 12 includes an element identification function to uniquely identify all DOM elements. For example, an ID attribute value of an element can be used. However, since an ID is not necessarily specified for each element in HTML data, a unique character string is issued and assigned to an element for which no ID attribute value is specified, and stored in the DOM storage unit 12. Alternatively, a specific attribute may be provided, and a serial number to be issued may be made a character string which is then assigned to each element and stored in the DOM storage unit 12.

The child browser determination unit 13 determines from the DOM stored in the DOM storage unit 12 a sub-tree for a portion of a digital content to be displayed in each of the child browsers 2A, 2B, and transmits the sub-tree of the DOM to the corresponding child browser 2A, 2B. When transmitting the sub-tree of the DOM to the child browser 2A, 2B, the child browser determination unit 13 also transmits CSS data. In this embodiment, a method of storing an attribute value in HTML data is used as a method of determining a sub-tree to be transmitted to the child browser 2A, 2B. Specifically, an attribute, device, is provided in an element which is a root of a sub-tree, and the child browser determination unit 13 identifies a DOM sub-tree to be transmitted to the child browser 2A, 2B based on the attribute value. If the element which is the root of the sub-tree can be identified, the sub-tree can be easily identified by tracing tree-structure data from the root and searching elements under the root element.

Figure 6:
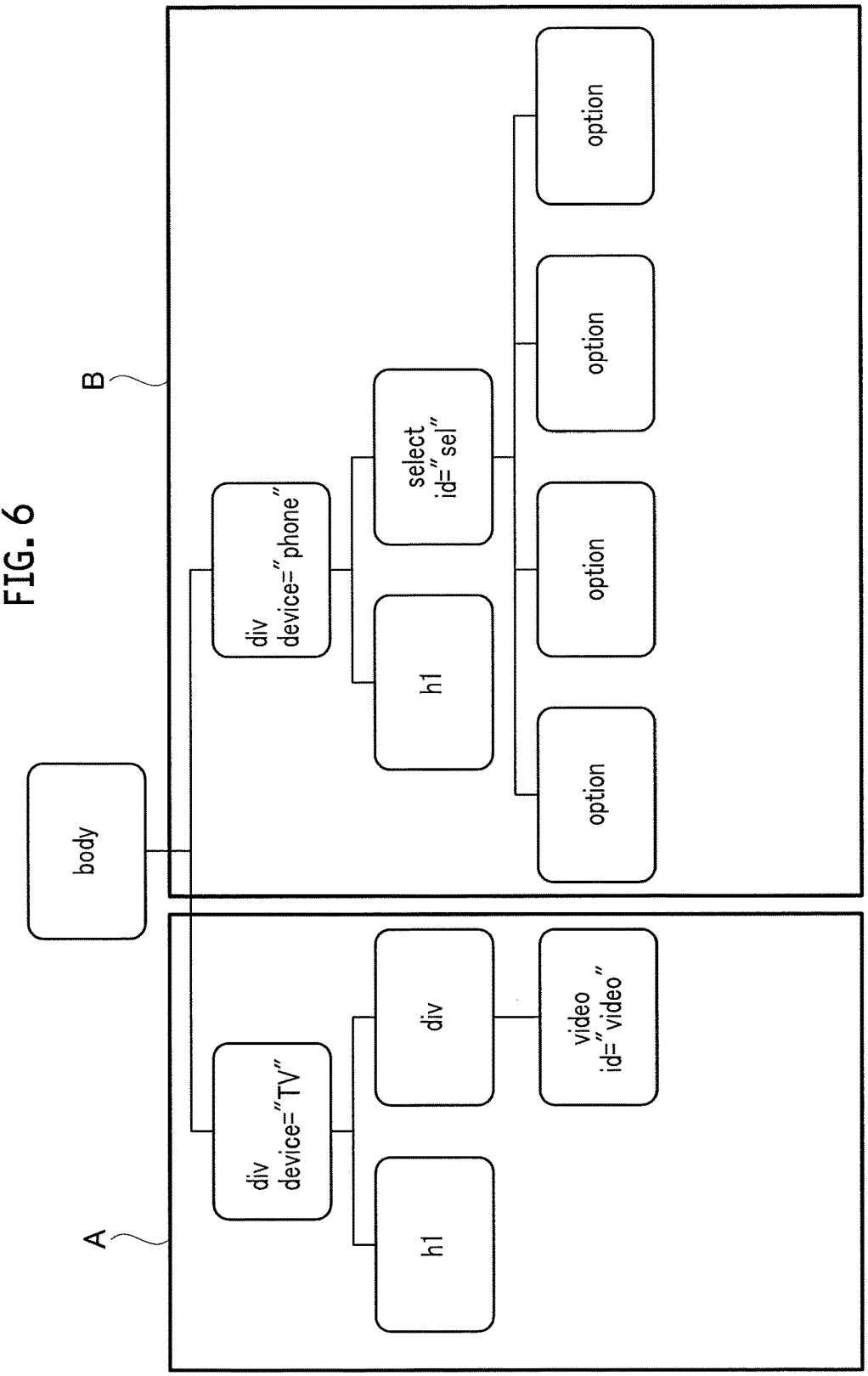
FIG. 6 is a view showing sub-trees transmitted by the DOM to child browsers.

In the DOM shown in FIG. 5, there are elements set "TV" or "Phone" for an attribute value of device. Thus, as shown in FIG. 6, there are a sub-tree A having as a root an element for which "TV" is set for the device attribute and a sub-tree B having as a root an element for which "Phone" is set for the device attribute. Based on attributes of the child browsers 2A, 2B (display capabilities of the child browsers 2A, 2B and the like), the child browser determination unit 13 determines the child browsers 2A, 2B to which the sub-trees A, B are to be transmitted and transmits the sub-trees A, B. For example, if the child browser 2A is a browser executed in a television set and the child browser 2B is a browser executed in a tablet terminal, the sub-tree A is transmitted to the child browser 2A and the sub-tree B is transmitted to the child browser 2B.

In addition, as a method of specifying an element which is a root of a DOM sub-tree, there is a method of providing JavaScript API which acquires a root element of a sub-tree and a child browser identifier as a parameter and setting. In addition, both the method of setting the device attribute for HTML data and the method of setting by API may be used.

While in this embodiment, it is assumed that each DOM element stored in the DOM storage unit 12 belongs to any of sub-trees (for which the device attribute is set), an element for which no device attribute is set may not be displayed in the child browser 2A or 2B. Alternatively, an element for which no device attribute is set may be displayed in a certain child browser determined.

The application script execution unit 14 interprets and executes JavaScript codes. In general, the application script execution unit 14 is the well-known technology called a JavaScript engine (for example, http://code.google.com/p/v8/). In addition, there is a JavaScript engine which is widely available as OSS (Open Source Software). Note that, the application script execution unit 14 in this embodiment goes through the DOM access unit 15 to be described below when JavaScript codes to be executed access a DOM through the DOM API. In JavaScript, it is possible to cause an original processing module to process access to a certain object (method call, property reference/setting, event listener setting), with a technique to extend prototype. In this embodiment, the application script execution unit 14 is set so that the DOM access unit 15 processes any access to a DOM.

When the application script execution unit 14 accesses a DOM with the JavaScript codes, the DOM access unit 15 notifies the child browser 2A, 2B holding the DOM (sub-tree) to be accessed to cause the application script execution unit 14 to access to the DOM which the child browser 2A, 2B itself holds. Then, the DOM access unit 15 receives a return value, if any. In addition, when an event occurs in the child browser 2A, 2B, the DOM access unit 15 receives an occurrence notice of the event from the child browser 2A, 2B, and causes a callback function, which has caused the event to occur and been registered in the DOM of the DOM storage unit 12, to be executed. As a method of configuring the DOM access unit 15, there is a method of classifying DOM APIs accessing to a DOM and implementing a program which performs processing according to the DOM APIs as prototype which extends the original DOM API. Specific classification of DOM APIs and details of their respective processes are described below.

The child browser communication unit 16 performs communications between the child browsers 2A, 2B and transmits and receives data. For example, the child browser communication unit 16 is constructed as a WebSocket server by using the technology known as WebSocket, and a WebSocket connection is established between the child browsers 2A, 2B to perform data transmission/reception. The data transmission/reception between the child browsers 2A, 2B includes transmission of a DOM sub-tree by the child browser determination unit 13, a request for access to a DOM from the access unit 15 to the child browser 2A, 2B, reception of a return value from the child browser 2A, 2B, and reception of an event occurrence notice from the child browser 2A, 2B. For transmission of a DOM sub-tree, the child browser communication unit 16 transmits HTML fragment data which is a text converted from the DOM sub-tree, and CSS data to the child browser 2A, 2B as a parameter. For the DOM access request from the DOM access unit 15 to the child browsers, the child browser communication unit 16 determines a message format in advance for each process, and transmits necessary information such as specification of an element and the like to the child browsers as a parameter. For the reception of a return value from the child browser, the child browser communication unit 16 receives a return value as a parameter. For the reception of an event occurrence notice from the child browser, the child browser communication unit 16 receives necessary information such as a type of an event which has occurred, identifier of an element where an event has occurred, and the like as a parameter.

In the following, child browsers are described.

The child browsers 2A, 2B includes a reception unit 21, a notification unit 22, a DOM storage unit 23, and a display unit 24.

The reception unit 21 receives data transmitted from the child browser communication unit 16 of the content display device 1 and executes a process according to the received data. When the child browser communication unit 16 is constructed as a WebSocket server, the reception unit 21 is constructed as a WebSocket client. Processes according to received data includes a process to receive data of a DOM sub-tree and store the data in the DOM storage unit 23, and a process related to access to the DOM stored in the DOM storage unit 23.

When the reception unit 21 receives data for a DOM sub-tree (HTML fragment data and CSS data), the DOM storage unit 23 is put in an initial state, specifically in a state in which only an empty HTML document (HTML only formed of <html><body></body></html>) is stored and CSS data has also been cleared. Then, the reception unit 21 adds the received HTML fragment data to the empty HTML document to create a DOM. The reception unit 21 also stores the received CSS data in the DOM storage unit 23.

When receiving data on access to a DOM, the reception unit 21 accesses the DOM based on the received data (DOM change, attribute change/reference, property change/reference, method call, event listener registration/cancellation and the like). If there is any return value for the access to the DOM, the reception unit 21 returns the return value to the content display device 1.

The notification unit 22 notifies the content display device 1 of an event which occurs in a DOM in the DOM storage unit 23. The notification unit 22 registers a process which transmits an event occurrence notice to the content display device 1, when the notification unit 22 receives a request for event listener registration from the content display device 1. Thus, when the event occurs in the DOM of the DOM storage unit 23, a process for the notification unit 22 to transmit the event occurrence notice is started.

The DOM storage unit 23 stores the received DOM sub-tree and is accessed depending on data received by the reception unit 21. The DOM storage unit 23 also stores the CSS data.

The display unit 24 performs display on the screen by applying the CSS to the DOM stored in the DOM storage unit 23 and performs interaction with users.

These units of the child browsers 2A, 2B can be configured by using a general Web browser. The reception unit 21 and the notification unit 22 can be implemented and configured with JavaScript. For example, HTML data is prepared in advance which executes, in loading, a process to create a WebSocket client and connect the WebSocket client to a WebSocket server of the content display device 1, and a process to register on_receive function as a process at a time of receiving data from the WebSocket server. Specifically, HTML data is prepared in which the above processes are written in init function and which executes the init function in an onload event. Then, by acquiring this HTML data, the child browser 2A, 2B can function as the reception unit 21 and the notification unit 22. In the on_receive function, each process based on the data received from the content display device 1 is written to implement a feature corresponding to the reception unit 21. For a process which is written in an on_receive function to register an event listener, an on_event function is registered on an element and event type specified to register the event listener. A process to determine a type of an event which has occurred and an identifier for its own element and send the content display device 1 an event occurrence notice having the determined values as parameters is written in the on_event function to implement a function corresponding to the notification unit 22.

In the following, a process which the DOM access unit 15 classifies DOM APIs are described.

(1) DOM Change (Element Addition/Deletion/Movement)

The DOM access unit 15 makes a change (element addition/deletion/movement) in a DOM stored the DOM storage unit 12. In addition, the DOM access unit 15 specifies an element to add, delete, or move on the corresponding child browser 2A, 2B. Then, the DOM access unit 15 inserts the element into, deletes the element from, or moves the element to a position of the specified DOM.

(2) Element Attribute Change (SetAttribute)

The DOM access unit 15 changes an attribute of an element in the DOM storage unit 12. In addition, the DOM access unit 15 specifies the element and causes the corresponding child browser 2A, 2B to change the attribute.

(3) Element Attribute Reference (getAttribute)

For data which needs to be acquired according to a content of display on the child browser 2A, 2B (for example, an option element set to "selected" which indicates that it is selected, and the like), the DOM access unit 15 specifies the element and causes the corresponding child browser 2A, 2B to refer to an attribute, and return a reference result. In other cases, the DOM access unit 15 refers an attribute of an element in the DOM storage unit 12.

(4) Element Property Change (Elem.Prop=Val)

The DOM access unit 15 sets a value (val) for a property (prop) corresponding to an element (elem) of the DOM storage unit 12. A value is also set for a property of an element of the corresponding child browser 2A, 2B. This process extends a definition as a setter (Object, defineProperty function, and the like) of JavaScript. In addition, for a property for an event listener (onchange or onclick and the like), a process to register an event listener to be described below is executed.

(5) Element Property Reference (Var x=Elem.Prop)

For data which needs to be acquired according to a content of display on the child browser 2A, 2B (for example, video_elm. curentTime which acquires a time stamp being played, for a video element), the DOM access unit 15 causes the corresponding child browser 2A, 2B to acquire a property of the corresponding element and return it as a return value. In other cases, the DOM access unit 15 acquires a property value from an element in the DOM storage unit 12. This process extends a definition as getter (Object.defineProperty function and the like) of JavaScript.

(6) Method Call of Element

The DOM access unit 15 causes the corresponding child browser 2A, 2B to call an element method. If a return value is needed, the DOM access unit 15 causes the child browser 2A, 2B to acquire a return value and return the return value.

(7) Event Listener Registration

The DOM access unit 15 registers a callback function specified for an element in the DOM storage unit 12. In addition, the DOM access unit 15 causes the corresponding child browser 2A, 2B to register an event occurrence notification process. Note that, if an event listener on a specified event type has already been registered, additional registration is not necessary. The event occurrence notification process is a process to notify the content display device 1 of a type of an event which has occurred and an identifier of an element in which the event has occurred, when the event has occurred in the element in the child browser 2A, 2B.

(8) Event Listener Cancellation

The DOM access unit 15 cancels a callback function registered in an element in the DOM storage unit 12. In addition, when there is no longer registered callback, the corresponding child browser 2A, 2B cancels the event occurrence notification process.

The above (1) to (8) are processes including access to a DOM held by the child browser 2A, 2B. The DOM access unit 15 transmits an appropriate message to the corresponding child browser 2A, 2B, and requests the child browser 2A, 2B for access to the DOM which the child browser 2A, 2B itself holds. Note that, the DOM access unit 15 can determine the corresponding browser 2A, 2B by holding in the DOM storage unit 12 which sub-tree is transmitted to which of the child browser 2A, 2B. As a method of identifying an element, an ID attribute value assigned by the element identification function of the DOM storage unit 12 can be used.

Then, listed below are processes by the DOM access unit 15 to access a DOM in the DOM storage unit 12, excluding access to a DOM held by the child browser 2A, 2B.

(9) Traverse (Search Process) in DOM

The DOM access unit 15 traverses (element search and the like) on a DOM in the DOM storage unit 12.

(10) Event Occurrence

When an event occurrence notice is received from the child browser, the DOM access unit 15 causes a corresponding element in the DOM storage unit 12 to occur an event. When the event occurs in the element, a callback function registered in the element is executed.

In the following, operation of the content display device 1 in this embodiment is described.

First, operation performed when the content display device 1 receives the digital content data shown in FIG. 2 and FIG. 3 is described.

When the content acquisition unit 11 acquires the HTML data in FIG. 2 from the Web server with the HTTP protocol, the content acquisition unit 11 also acquires the JavaScript codes in FIG. 3 since the acquired HTML data has a tag <script type="text/javascript" src="Sample.js">.

The acquired HTML data is analyzed, converted into a DOM, and stored in the DOM storage unit 12.

Then, the child browser determination unit 13 determines a sub-tree to be transmitted to the child browsers 2A, 2B from the DOM stored in the DOM storage unit 12. The sub-trees A, B in FIG. 6 are determined as sub-trees to be transmitted to the child browsers 2A, 2B, respectively.

Figures 7, 8:
FIG. 7 is a view showing a display example of the sub-tree.
FIG. 8 is a view showing a display example of another sub-tree.

The sub-trees A, B determined by the browser determination unit 13 are transmitted to the corresponding child browsers 2A, 2B through the child browser communication unit 16. Here, it is supposed that the sub-tree A is transmitted to the child browser 2A and the sub-tree B is transmitted to the child browser 2B. Each of the child browsers 2A, 2B receives the transmitted DOM sub-tree, stores the sub-tree in the DOM storage unit 23, and displays the sub-tree in the display unit 24. FIG. 7 shows the screen displayed in the child browser 2A which has received the sub-tree A. FIG. 8 shows the screen displayed in the child browser 2B which has received the sub-tree B.

Figure 9:
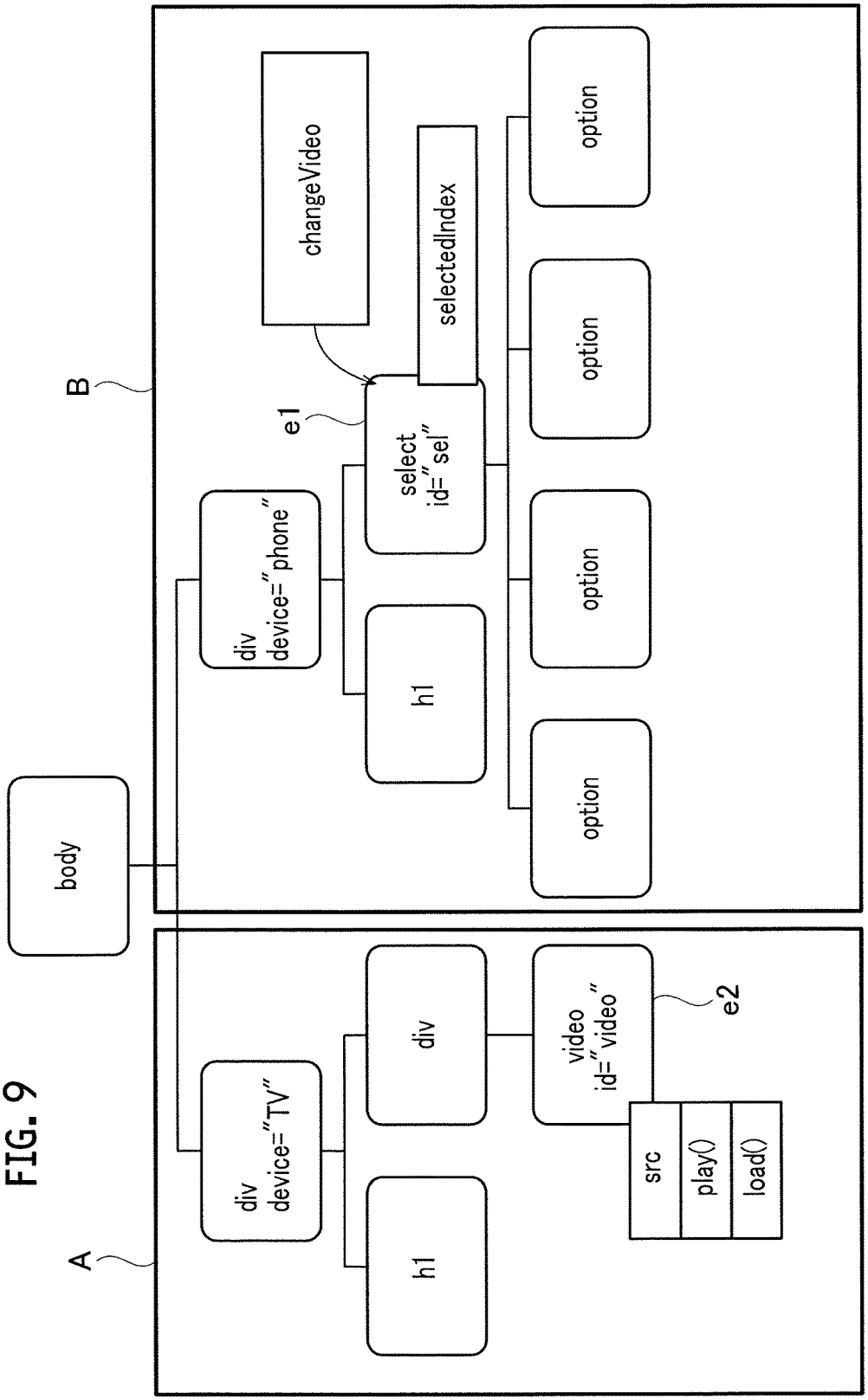
FIG. 9 is a view showing how callback is registered in the DOM.

In addition, in the application script execution unit 14 of the content display unit 1, the init function of FIG. 3 is started when the HTML data is loaded. With the init function, addEventListener function registers in an element with an ID attribute "sel" a callback function which is defined as changeVideo for a change event. This addEventListener function performs an operation extended by the DOM access unit 15. Specifically, as shown in FIG. 9, the changeVideo function for the change event is registered as a callback function in an element e1 of the DOM storage unit whose ID attribute is "sel", and an event occurrence notification process for the change event is registered in the element e1 of the DOM storage unit 23 of the child browser 2B which has received the sub-tree B. In addition, FIG. 9 shows selectedIndex property, src property, load method and play method, which are below used for describing an operation performed when a user manipulates a list box.

In the following, an operation performed when the user manipulates the list box displayed in the child browser 2B and selects a different choice is described.

When the user manipulates the list box displayed in the child browser 2B and selects a different choice, a change event occurs in the element e1 in the DOM storage unit 23 of the child browser 2B, the event occurrence notification process is started, and an event occurrence notice is transmitted to the content display device 1.

When the child browser communication unit 16 receives an event occurrence notice, the DOM access unit 15 causes the element e1 of the DOM storage unit 12 to occur a change event. The event occurrence starts the changeVideo function which has been registered as a callback function in the element e1 of the DOM storage unit 12, and the application script execution unit 14 executes the changeVideo function of FIG. 3.

A process to acquire a property, selectedIndex, from the element e1 is written in the changeVideo function. The process is executed by the getter which has been extended by the DOM access unit 15, and transmits to the child browser 2B holding the element e1 a request to acquire and return the selectedIndex property of the element e1. With the processing, the content display device 1 acquires selectedIndex which has been selected in the child browser 2B through a manipulation of the user.

Furthermore, in the changeVideo function is written a process to set motion video corresponding to a value of selectedIndex which was acquired for property, src, of an element e2 whose ID attribute is "video". The process is executed by the setter which has been extended by the DOM access unit 15, and transmits to the child browser 2A holding the element e2 a request to set the motion video selected for the src property of the element e2.

In addition, then, a process to call the load method and a process to invoke the play method of an element e2 are written. These processes are executed by the DOM access unit 15 transmitting to the child browser 2A holding the element e2 a request to call the load method and the play method of the element e2. In the display unit 24 of the child browser 2A which receives the request for calling the methods, the motion video selected by the child browser 2B is loaded and playing starts.

Figure 10:
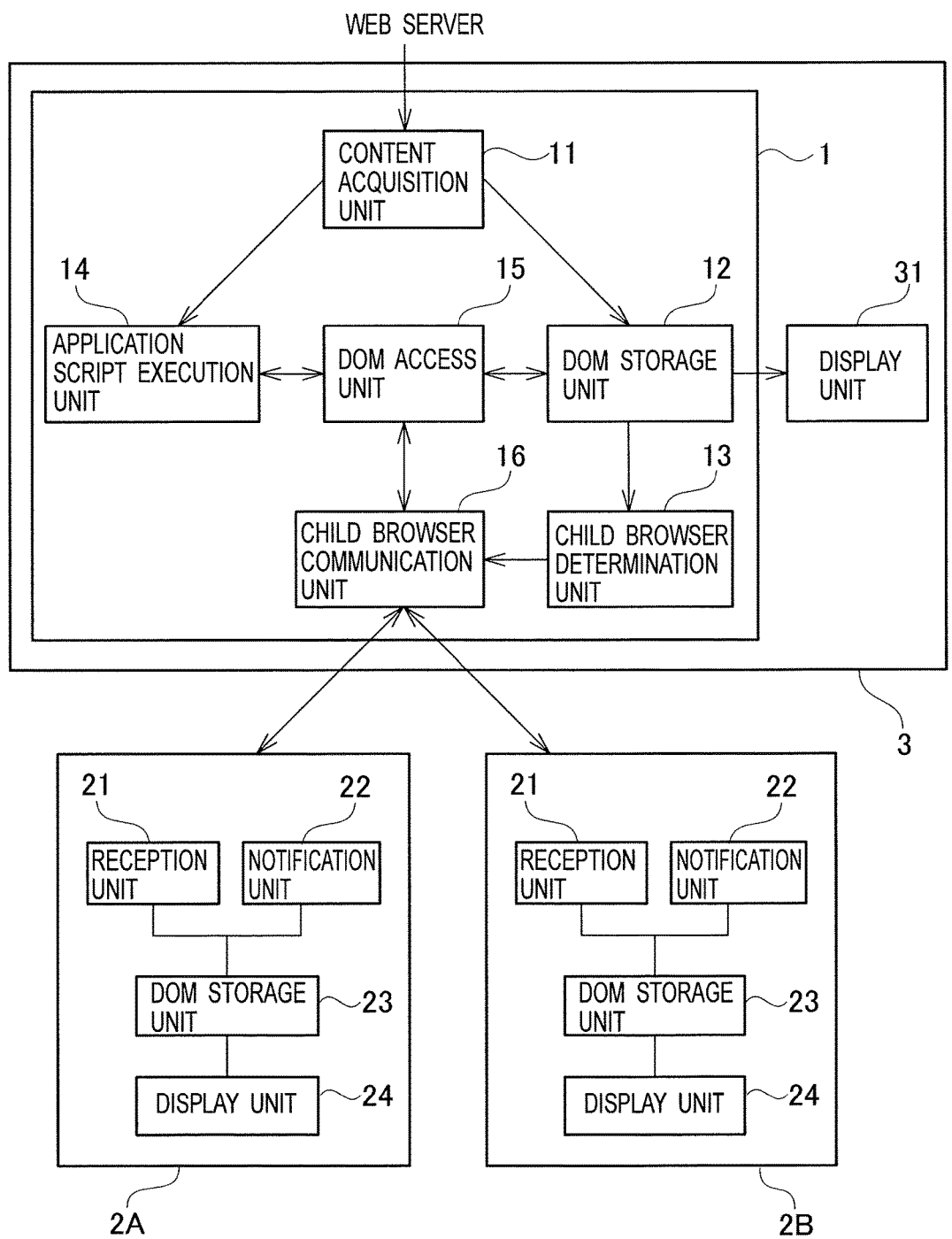
FIG. 10 is an overall configuration diagram including a content display device and browsers provided with a display unit.

The embodiment in which the content display device 1 divides digital content data, transmits the data to the child browsers 2A, 2B, and causes the child browsers 2A, 2B to display the data has been described above. However, as shown in FIG. 10, the content display device 1 may include a display unit 31 to configure a browser 3, and may operate as one child browser to display a content by accessing the DOM storage unit 12. In this case, the display unit 31 causes a DOM of the DOM storage unit 12 to occur an event and to execute a callback function.

In addition, the display unit 31 may display elements other than an element for which a device attribute is specified and elements thereunder, that is to say, elements which do not belong to a sub-tree to be transmitted to the child browser. Alternatively, since the element for which the device attribute is specified and the elements thereunder are parts to be displayed in the child browsers, the display unit 31 may forcibly make them invisible. Thus, a device in which the content display device 1 is implemented may be a device which only performs display control of a content as shown in FIG. 1 or a device which not only performs display control of a content but also acts as a child browser which displays the content, like a modification example of the content display device 1 as shown in FIG. 10. In the case of FIG. 1, the child browsers 2A, 2B are devices having a separate housing from the content display device 1. The child browsers 2A, 2B are implemented by mounting browsers. Note that, the plurality of child browsers 2A, 2B may operate in different devices or the plurality of child browsers 2A, 2B may operate in one device. Also in the modification example of the content display device 1 in FIG. 10, the browser 3 may operate as one child browser or as a plurality of child browsers.

As described above, according to this embodiment, the content display device 1 expands HTML data into a DOM and stores in the DOM storage unit 12, determines a sub-tree for a portion of a digital content to be displayed in each of the child browsers 2A, 2B from the DOM, and transmits to the corresponding child browsers 2A, 2B, and when the application script execution unit 14 executes a process to access the DOM with JavaScript codes, the DOM access unit 15 requests the child browsers 2A, 2B holding the sub-tree to be accessed to access the DOM, and when an event occurrence notice is received from the child browsers 2A, 2B, an event is occurred in the DOM of the DOM storage unit 12 and a callback function is executed. Thus, one piece of content data can be divided to be displayed in a plurality of child browsers 2A, 2B. With this, the digital content which operates the plural child browsers 2A, 2B cooperatively can be delivered only by preparing digital content data equivalent to that to be delivered to a single browser and specifying which part of HTML data of the digital content data is displayed in the child browsers 2A, 2B, to deliver a digital content which operates a plurality of child browsers 2A, 2B cooperatively.

(Second Embodiment)

As a second embodiment, an operation performed when a change (element addition/deletion/movement) is made to a DOM stored in a DOM storage unit 12 of a content display device 1 is described with an illustrative example.

Figure 12:
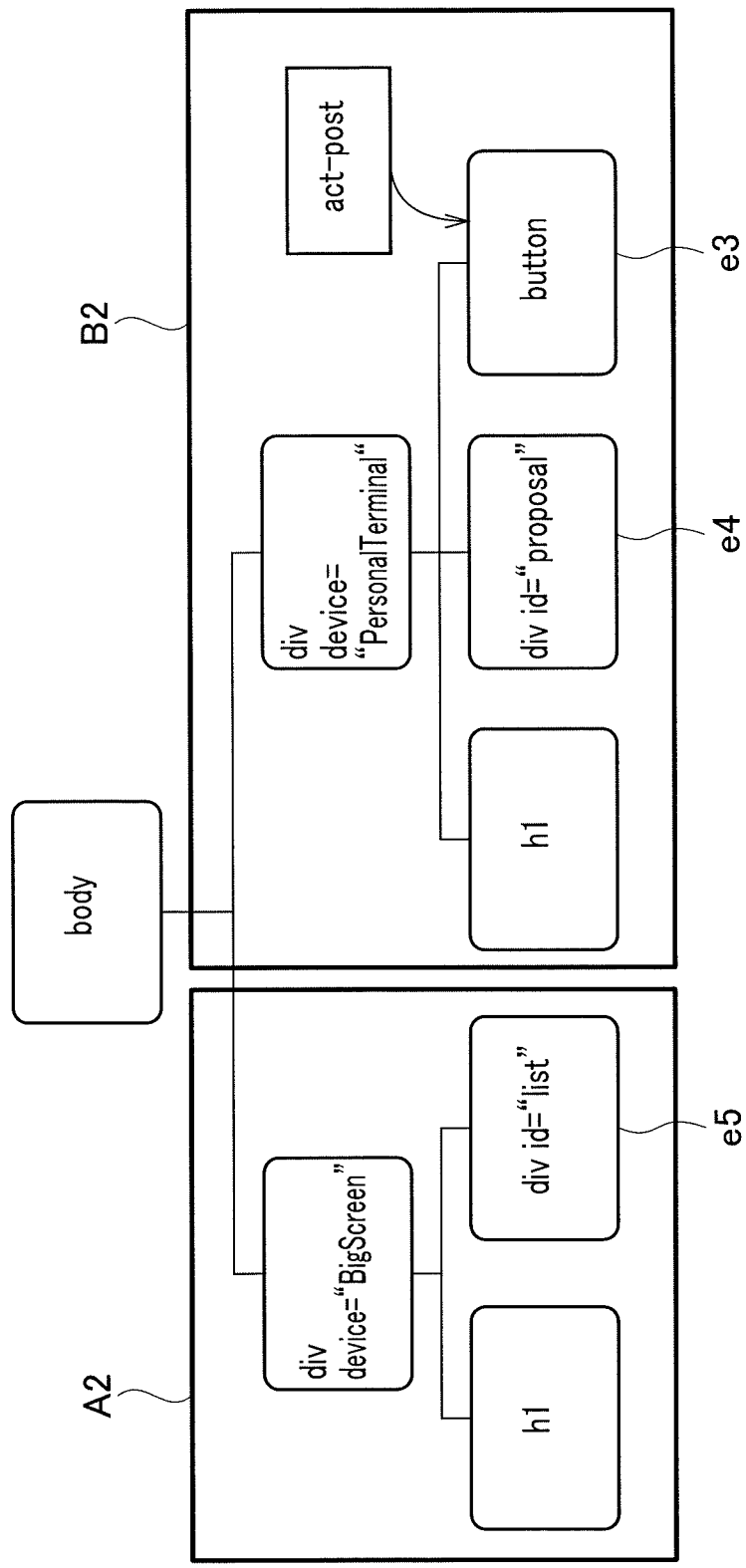
FIG. 12 is a view showing a DOM tree structure converted from the HTML data.

When HTML data including JavaScript codes (an example in which "JQuery", a generally known library of JavaScript, is used) as shown in FIG. 11 is downloaded, the JavaScript codes specified by script tags are sent to an application script execution unit 14, and other HTML data is converted into DOMs and stored in the DOM storage unit 12. FIG. 12 shows a tree structure of the DOM converted from the HTML data of FIG. 11.

Figure 13:
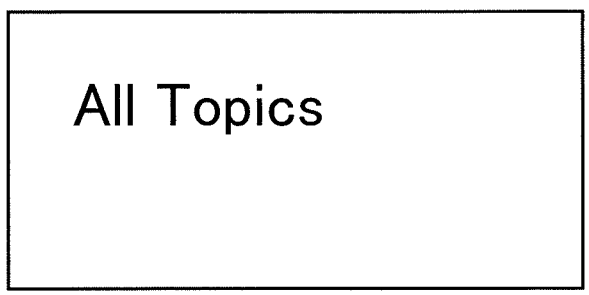
FIG. 13 is a view showing a display example of the sub-tree.
Figure 14:
FIG. 14 is a view showing a display example of another sub-tree.

Child browsers 2A, 2B are connected to the content display device 1, a sub-tree A2 having as a root an element for which "BigScreen" is set for a device attribute is transmitted to the child browser 2A, and a sub-tree B2 having as a root an element for which "PersonalTerminal" is set for a device attribute is transmitted to the child browser 2B. FIG. 13 shows the screen displayed in the child browser 2A which received the sub-tree A2. FIG. 14 shows the screen displayed in the child browser 2B which received the sub-tree B2.

The act_post function is registered as a callback function for a click event in a <button> element e3 in the DOM storage device 12, and an event occurrence notification process is registered for the click event in a corresponding <button> element e3 in the DOM storage unit 23 of the child browser 2B.

Figure 16:
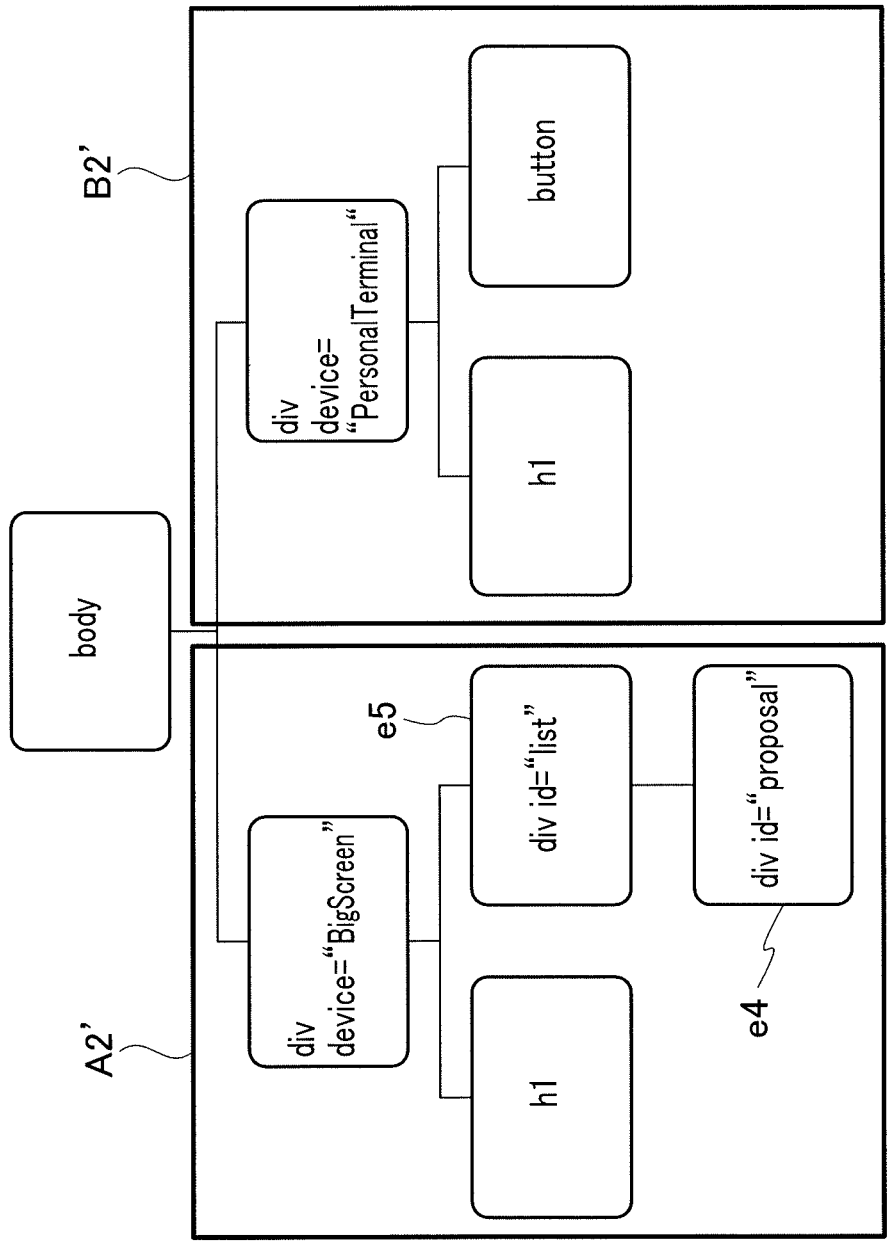
FIG. 16 is a view showing the DOM tree structure converted from the HTML data after being changed.

When the <button> element e3, that is to say, "POST" button is clicked in the child browser 2B, the act_post function is executed in the content display device 1. With the act_post function, a process to move an element e4 whose ID attribute is "proposal" under an element e5 whose ID attribute is "list" is executed, and the tree structure of the DOM stored in the DOM storage unit 12 is changed. FIG. 15 shows the HTML data after being changed. FIG. 16 shows the tree structure of the DOM after being changed. As shown in the tree structure of FIG. 16, the element e4 has been moved under the element e5.

A child browser determination unit 13 detects the change in the DOM, and sends the child browser 2B a request to delete the element e4, which is a part of the sub-tree B2, and sends the child browser 2A a request to add the element e4 under the element 5. As a result, with the element e4 added to thereto, the DOM stored in the DOM storage unit 23 in the child browser 2A becomes the same as the sub-tree A2' of the DOM stored in the DOM storage unit 12 of the content display device 1. With the element e4 deleted therefrom, the DOM stored in the DOM storage unit 23 of the child browser 2B becomes the same as the sub-tree B2' of the DOM stored in the DOM storage unit 12 of the content display device 1. FIG. 17 shows the screen to be displayed in the child browser 2A. FIG. 18 shows the screen to be displayed in the browser 2B. As shown in FIG. 17 and FIG. 18, it becomes possible to show as if a portion of the digital content (element e4) has crossed the devices and been moved from the child browser 2B to the child browser 2A.

In addition, if the callback function is specified in the moving element e4, the child browser 2B is requested of a process to cancel an event listener, and the child browser 2A is requested of a process to register an event listener.

A process to add an element and a process to delete an element also work similar to the above. When an element is added, it becomes possible to show as if the added element newly appears on the screen of the child browser. When an element is deleted, it becomes possible to show as if the element disappears from the screen of the child browser.

In this embodiment, while the example of moving the portion (element e4) of the sub-tree B2 stored in the DOM storage unit 23 of the child browser 2B to the child browser 2A is described, the description also applies when the entire sub-tree B2 is moved to the child browser 2A. In a content display method of causing a plurality of child browsers to display a digital content in the embodiment as described above, the following steps are performed: acquiring content data including a script and expanding the data into tree-structure data; causing a first child browser, which is one of the plurality of child browsers, to display a digital content corresponding to the entire tree-structure data or a sub-tree which is a part thereof; and causing the first child browser not to display the digital content corresponding to the entire sub-tree or the part thereof and causing a second child browser, which is different from the first child browser, to display the digital content corresponding to the entire sub-tree or the part thereof.

(Third Embodiment)

As a third embodiment, an operation performed when a part of a DOM sub-tree displayed in one child browser is moved to another child browser and displayed is described.

In this embodiment, a child browser communication unit 16 detects a communication state with each of child browsers and notifies a child browser determination unit 13 of a detected result as a communication state. A communication state may be detected, by receiving specific data, for example data indicating start of communications when the communications start and data indicating end of the communications when the communications end, from a child browser.

The child browser determination unit 13 receives a notice of a communication state with each of the child browsers from the child browser communication unit 16 and stores the notified communication state for each child browser. When a child browser is newly enabled to communicate or when a child browser is disabled to communicate, the child browser determination unit 13 determines a sub-tree to be assigned to the child browser.

In the following is described an example in which when child browsers 2A, 2B are in a communication-enabled state and display a digital content, and a new child browser 2C is enabled to communicate, a portion of the digital content displayed in the child browser 2B is moved to and displayed in the child browser 2C.

Figure 20:
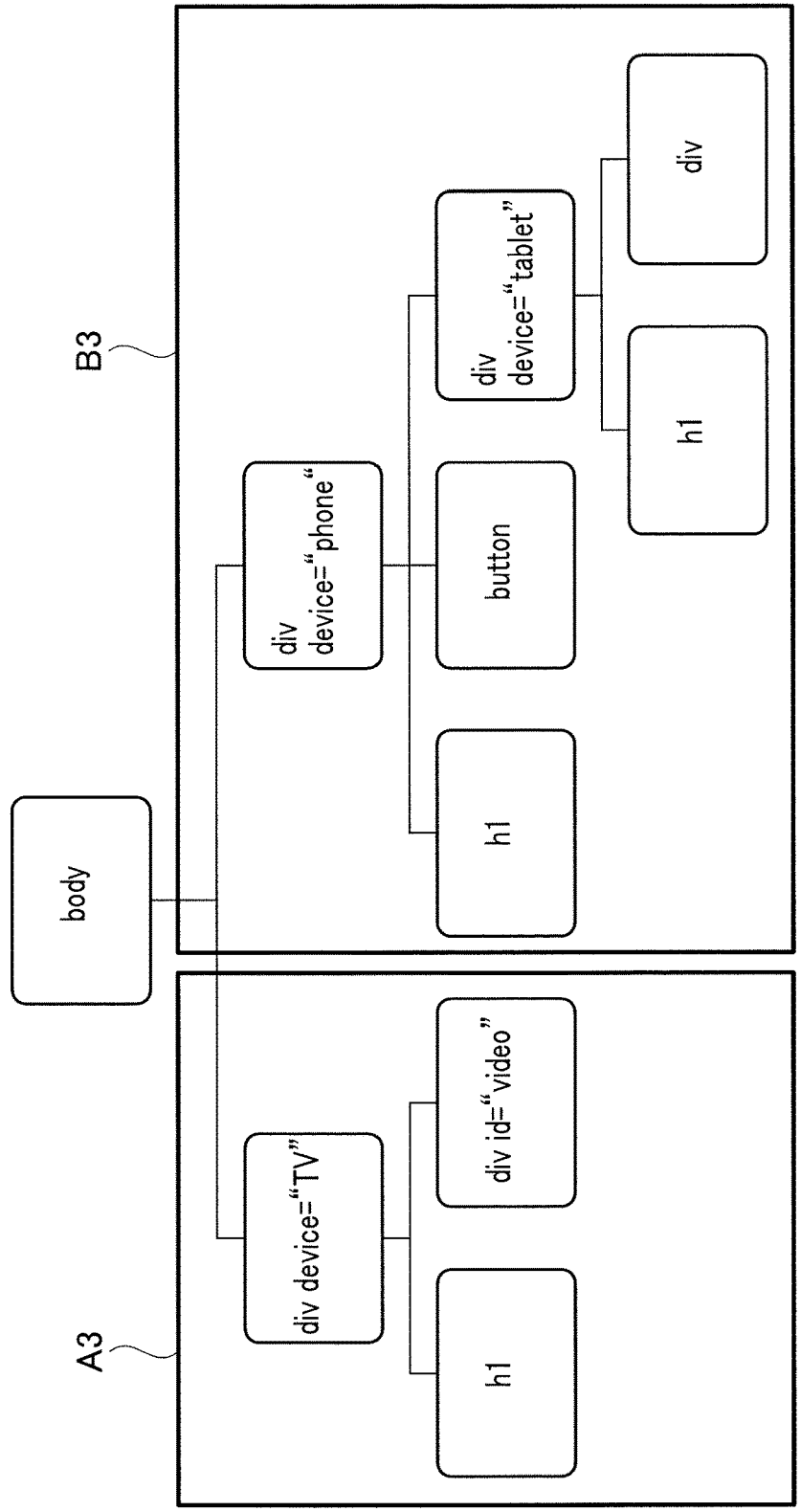
FIG. 20 is a view showing the DOM tree structure converted from the HTML data.
Figure 21:
FIG. 21 is a view showing a display example of the sub-tree.
Figure 22:
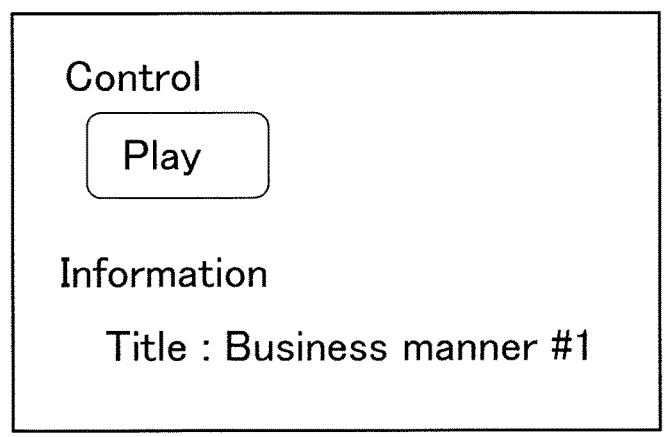
FIG. 22 is a view showing a display example of another sub-tree.

First, it is supposed that a content display device 1 and the child browsers 2A, 2B are in a communication-enabled state and cannot communicate with the child browser 2C. HTML data shown in FIG. 19 is downloaded to the content display device 1. As shown in FIG. 20, the HTML data is converted into a DOM tree structure. A sub-tree A3 having as a root an element for which "TV" is set for a device attribute is transmitted to the child browser 2A, and a sub-tree B3 having as a root an element for which "phone" is set for a device attribute is transmitted to the child browser 2B. FIG. 21 shows the screen displayed in the child browser 2A which received the sub-tree A3. FIG. 22 shows the screen displayed in the child browser 2B which received the sub-tree B3.

Figure 23:
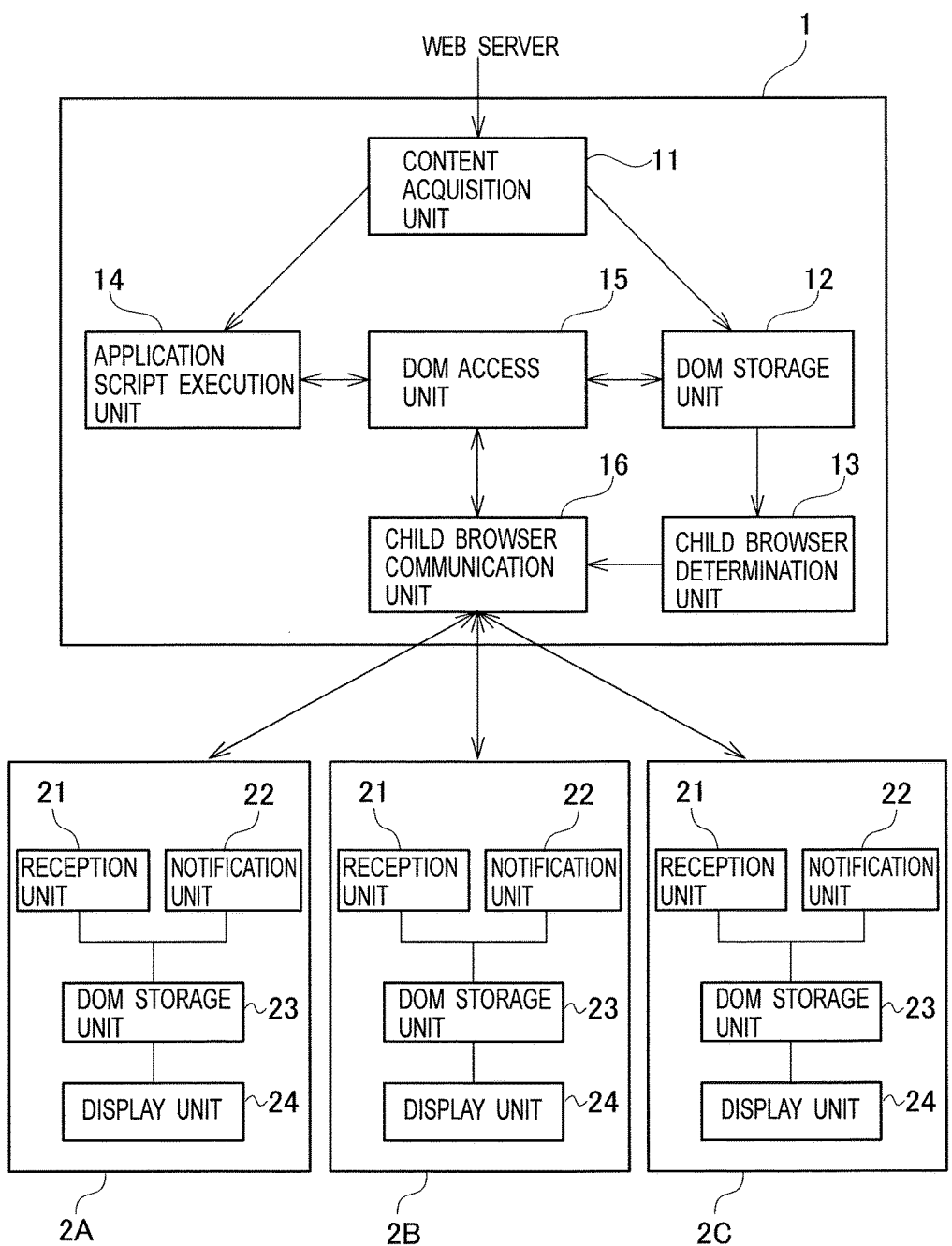
FIG. 23 is a view showing that another child browser is enabled to communicate.

Then, as shown in FIG. 23, when the child browser 2C enters a state enabled to communicate with the content display device 1, the child browser communication unit 16 detects that the content display device 1 is enabled to communicate with the child browser 2C and notifies the child browser determination unit 13 of that communication state.

The child browser determination unit 13 determines a sub-tree C3 for the child browser 2C which is enabled to communicate, and transmits the sub-tree C3 to the child browser 2C through the child browser communication unit 16. In this embodiment, the child browser determination unit 13 determines that the sub-tree C3 having as a root an element for which "tablet" is set for a device attribute is a sub-tree to be transmitted to the child browser 2C. In addition, when a callback function is specified for the element of the sub-tree C3, The child browser determination unit 13 requests the child browser 2C of a process to register an event listener.

Since the sub-tree C3 which is a part of the sub-tree B3 is transmitted to the child browser 2C, the child browser determination unit 13 requests the child browser 2B which has already transmitted the sub-tree B3 not to display the sub-tree C3, that is to say, transmits a request to delete the sub-tree C3, through the child browser communication unit 16.

Figure 24:
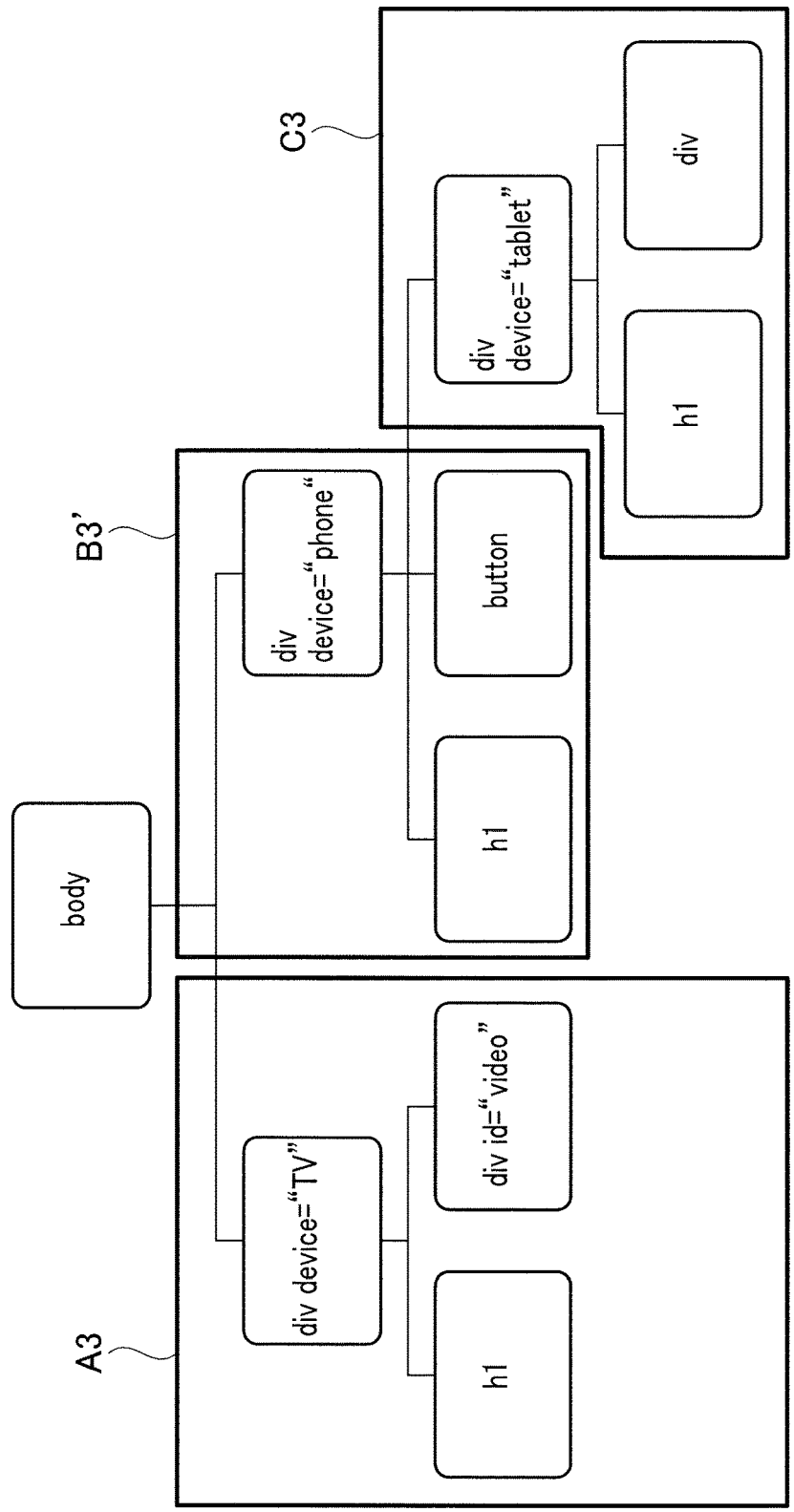
FIG. 24 is a view showing that the DOM is assigned to three child browsers.
Figure 25:
FIG. 25 is a view showing a display example of the sub-tree.
Figure 26:
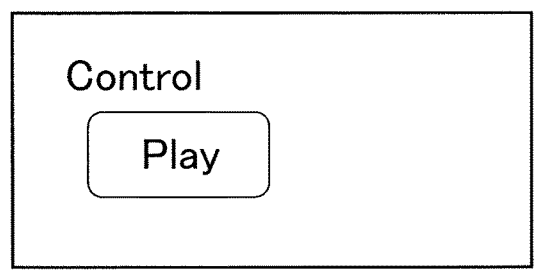
FIG. 26 is a view showing a display example of another sub-tree.
Figure 27:
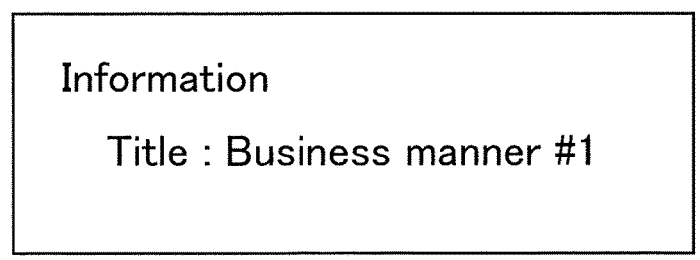
FIG. 27 is a view showing a display example of the further different sub-tree.

FIG. 24 shows sub-trees A3, B3', C3 assigned to the child browsers 2A, 2B, 2C, respectively. FIG. 25 shows the screen displayed in the child browser 2A which received the sub-tree A3. FIG. 26 shows the screen displayed in the child browser 2B which received the sub-tree B3'. FIG. 27 shows the screen displayed in the child browser 2C which received the sub-tree C3. As can be seen from a comparison of FIG. 22 and FIG. 26, FIG. 27, since the digital content for the sub-tree C3 displayed in the child browser 2B disappears from the child browser 2B and is displayed in the child browser 2C, it looks like that the a portion of the digital content has stridden across the devices and moved. The third embodiment is same as the second embodiment in that it looks like that the portion of the digital content has moved between the devices. However, the third embodiment differs from the second embodiment in that no change has been made to the tree-structure of the DOM stored in the DOM storage unit 12 of the content display unit 1.

In the following, an operation performed when the child browser 2C enters a communication-disabled state while the content display device 1 and the child browsers 2A, 2B, 2C are in a communication-enabled state is described.

It is supposed that the content display device 1 and the child browsers 2A, 2B, 2C are in a communication-enabled state, and a digital content is displayed in the child browsers 2A, 2B, 2C, as shown in FIG. 25 to FIG. 27.

Then, if the child browser 2C enters a communication-disabled state, the child browser communication unit 16 detects that communications with the child browser 2C has become disabled, and notifies the child browser determination unit 13 of that communication state.

The child browser determination unit 13 determines the sub-tree C3 transmitted from the DOM stored in the DOM storage unit 12 to the child browser 2C.

Then, the child browser determination unit 13 determines the child browser 2B displaying an element directly above the sub-tree C3, and transmits a request to add the sub-tree C3 to the child browser 2B through the child browser communication unit 16.

After the process is executed, the screen to be displayed in the child browser 2B is the screen shown in FIG. 22. The digital content which corresponds to the sub-tree C3 displayed in the child browser 2C disappears from the child browser 2C and is displayed in the child browser 2B. Thus, it looks like that the portion of the digital content has stridden across the devices and moved. In the content display method of causing a plurality of child browsers to display a digital content as described in this embodiment, the following steps are performed: acquiring content data including a script and expanding the data into a tree-structure data; causing a first child browser, which is one of the plurality of child browsers, to display a digital content corresponding to the entire tree-structure data or a sub-tree which is a part thereof; and causing the first child browser not to display the digital content corresponding to the entire sub-tree or the part thereof and causing a second child browser, which is different from the first child browser, to display the digital content corresponding to the entire sub-tree or the part thereof.

(Fourth Embodiment)

As a fourth embodiment, an operation performed when a plurality of browsers are caused to share and display a DOM sub-tree is descried with an illustrative example. In the third embodiment, when the child browser 2C has newly become communication-enabled, the portion of the digital content (sub-tree C3) displayed in the child browser 2B is deleted from the child browser 2B and displayed in the child browser 2C. In the fourth embodiment, however, an example in which the sub-tree C3 is displayed in the child browser 2C, with the display in the child browser 2B unchanged is described.

First, similar to the third embodiment, it is supposed that a content display device 1 and child browsers 2A, 2B are enabled to communicate and cannot communicate with the child browser 2C. HTML data as shown in FIG. 19 is downloaded to the content display device 1, sub-trees A2, B2 as shown in FIG. 20 are transmitted to the child browsers 2A, 2B, and the digital content is displayed in the child browsers 2A, 2B, as shown in FIG. 21 and FIG. 22.

Then, as shown in FIG. 23, when the child browser 2C enters a state enabled to communicate with the content display device 1, the child browser determination unit 13 determines the sub-tree C3 for the child browser 2C and transmits the sub-tree C3 to the child browser 2C through the child browser communication unit 16. Then, the child browser determination unit 13 does not transmit to the child browser 2B a request to delete the sub-tree C3 which is a part of the sub-tree B3. With this, the sub-tree 3 is shared by the child browsers 2B, 2C.

Figure 28:
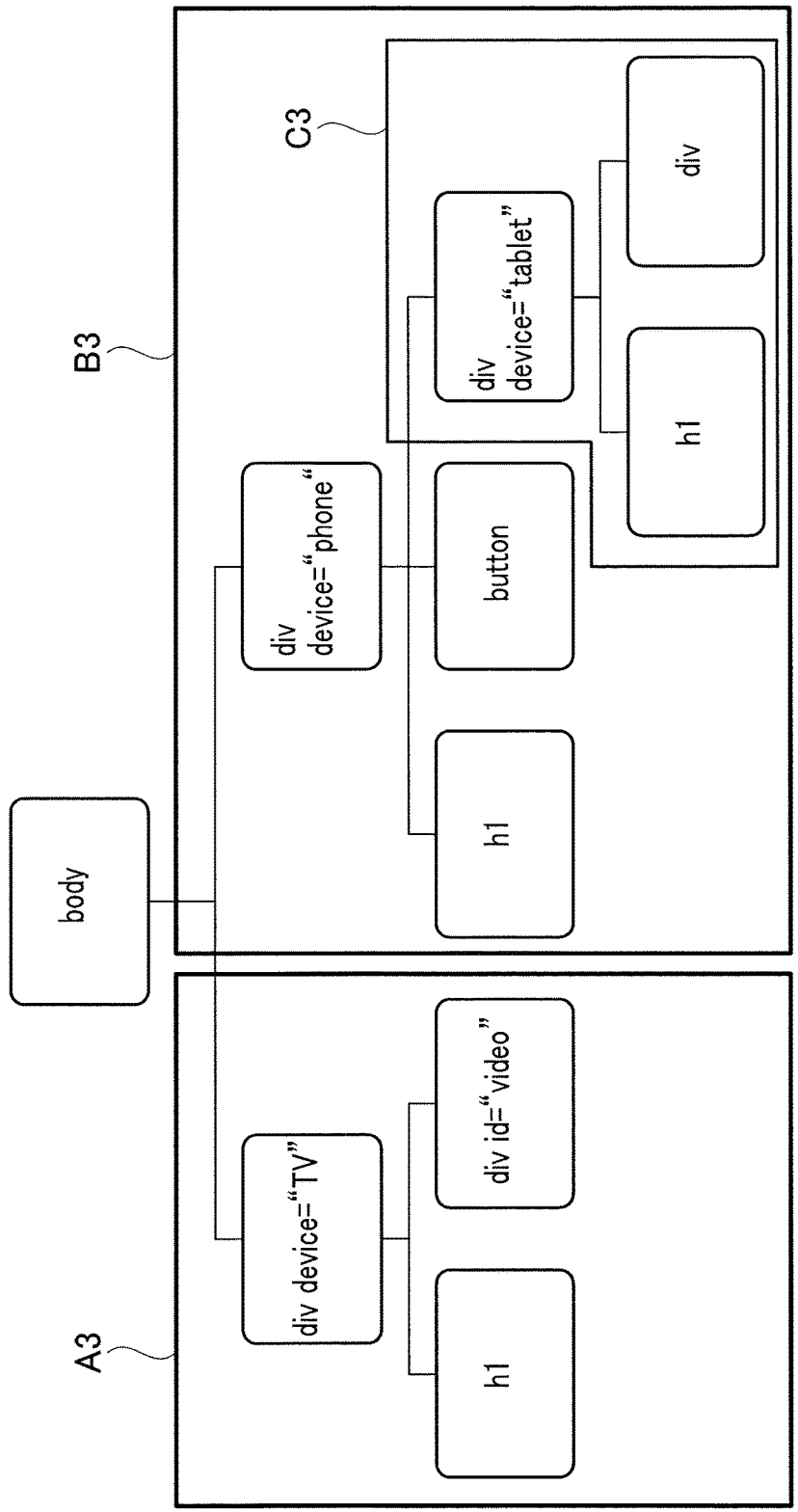
FIG. 28 is a view showing that a content display device in a fourth embodiment assigns the DOM to three child browsers.
Figure 29:
FIG. 29 is a view showing a display example of the sub-tree.
Figure 30:
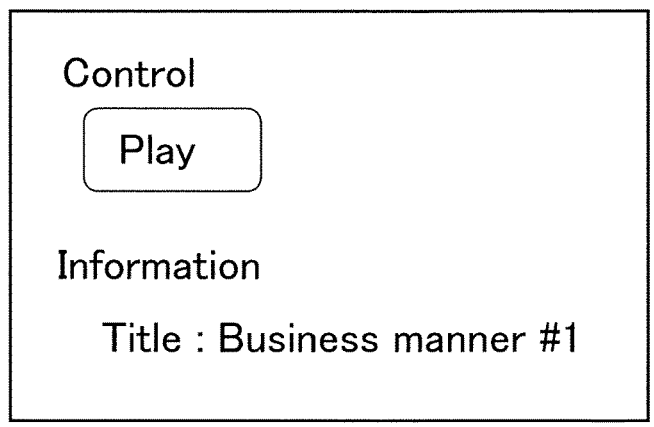
FIG. 30 is a view showing a display example of another sub-tree.
Figure 31:
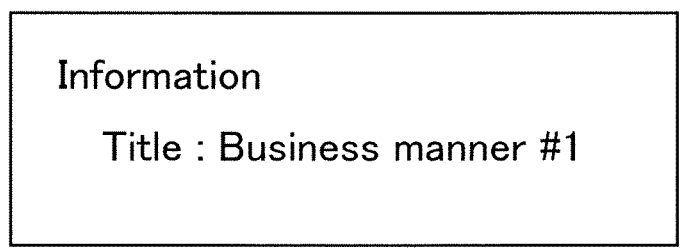
FIG. 31 is a view showing a display example of the further different sub-tree.

FIG. 28 shows sub-trees A3, B3, C3 assigned to the child browsers 2A, 2B, 2C, respectively. FIG. 29 shows the screen displayed in the child browser 2A which received the sub-tree A3. FIG. 30 shows the screen displayed in the child browser 2B which received the sub-tree B3. FIG. 31 shows the screen displayed in the child browser 2C which received the sub-tree C3. As can be seen in FIG. 30 and FIG. 31, a digital content corresponding to the sub-tree C3 is displayed in both of the child browsers 2B, 2C.

In addition, if the child browser 2C is disabled to communicate after the sub-tree C3 is transmitted to the child browser 2C, nothing is done on the child browser 2B. In the content display method of causing a plurality of child browsers to display a digital content in the embodiment as described above, the following steps are performed: acquiring content data including a script and expanding the data into tree-structure data; causing a first child browser, which is one of the plurality of child browsers, to display a digital content corresponding to the entire tree-structure data or a sub-tree which is a part thereof; and causing a second child browser, which is different from the first child browser, to display the digital content corresponding to the entire sub-tree or the part thereof.

Note that, in this embodiment, the description is provided for the sharing (replication) of the digital content based on sub-tree, which is triggered by a change in a communication state between the content display device 1 and the child browsers. However, the present invention is not limited to this. In response to various events (operations and the like) which cause a digital content based on a sub-tree to be displayed in a child browser as a sharing target (replication target), the child browser displays the digital content based on the sub-tree. The events which cause a child browser as a sharing target to display a digital content are as follows, for example. Here, a child browser (the child browser 2B in this embodiment) at a sharing source (replication source) of a digital content is made a "first child browser", a child browser (the child browser 2C in this embodiment) at a sharing target (replication target) of a digital content is made a "second child browser", and any browsers other than the first child browser and the second child browser are made a "third child browser".

(1) Instruction from the First Child Browser

The first child browser receives a manipulation instruction entered by a user and notifies the child browser determination unit 13 of an instruction to display at the second child browser through the child browser communication unit 16. With this, the child browser determination unit 13 may transmit to the second child browser a sub-tree for the second child browser, and the second child browser may display a digital content based on the sub-tree. For example, a trigger such as a button to cause the second child browser to display is in the digital content displayed by the first child browser or in the first child browser itself, and the user turns ON the trigger. With this, the first child browser notifies the child browser determination unit 13 of the display instruction to the second browser.

In addition, at the timing when a predetermined period of time elapses after the first child browser itself displays the digital content, the first child browser automatically notifies the child browser determination unit 13 of the display instruction to the second browser. In response to this trigger, the second child browser may display the display content based on the sub-tree.

(2) Instruction from the Second Child Browser

The second child browser receives a manipulation instruction entered by a user and notifies the child browser determination unit 13 of an instruction to display at the second child browser itself. With this, the child browser determination unit 13 may transmit to the second child browser a sub-tree for the second child browser, and the second child browser may display a digital content based on the sub-tree. For example, a trigger such as a button to cause the second child browser to display is in the digital content displayed by the second child browser or in the second child browser itself, and the user turns ON the trigger. With this, the second child browser notifies the child browser determination unit 13 of the display instruction at the second browser itself.

In addition, at the timing when the second child browser detects that the second child browser is in a state enabled to display the digital content, the second child browser notifies the child browser determination unit 13 the display instruction at the second child browser itself. In response to this trigger, the second child browser may display the digital content based on the sub-tree. As the timing when display of a digital content is enabled, there are the timing when the second child browser is connected to a network, timing when the second child browser is connected to a display (turning ON the power of the display, cable connection, a shift from a sleep state to an active state and the like).

In addition, like a screensaver, at the timing when there has been no user operation for a predetermined period of time, the second child browser may notify the child browser determination unit 13 of an instruction to display at the second child browser itself. In response to this trigger, the second child browser may display the digital content based on the sub-tree.

(3) Instruction from the Third Child Browser

The third child browser receives a manipulation instruction entered by a user and notifies the child browser determination unit 13 of a display instruction to the second child browser. With this, the child browser determination unit 13 may transmit to the second child browser a sub-tree for the second child browser, and the second child browser may display a digital content based on the sub-tree. For example, a trigger such as a button to cause the second child browser to display is in the digital content displayed by the third child browser or in the third child browser itself, and the user turns ON the trigger. With this, the third child browser notifies the child browser determination unit 13 of the display instruction to the second browser.

In addition, at the timing when the digital content becomes invisible in the third child browser itself (for example, the user pressing "X (Close) button" of the third child browser, and the like), the third child browser notifies the child browser determination unit 13 of the display instruction to the second child browser. In response to this trigger, the second child browser may display the digital content based on the sub-tree.

(Fifth Embodiment)

In a fifth embodiment are described a data structure identifying child browsers which share an element and an operation on an element shared by a plurality of child browsers, when the DOM sub-tree (element) is shared and displayed by the plurality of child browsers.

In a content display device 1 in this embodiment, an array as a storage area for storing identifiers of a plurality of child browsers is included in the each element of a DOM in order to identify which child browsers share the element shared by a plurality of child browsers. A child browser determination unit 13 may include this storage area or a storage area may be provided in a DOM storage unit 12 and referred by a child browser determination unit 13.

Figure 32:
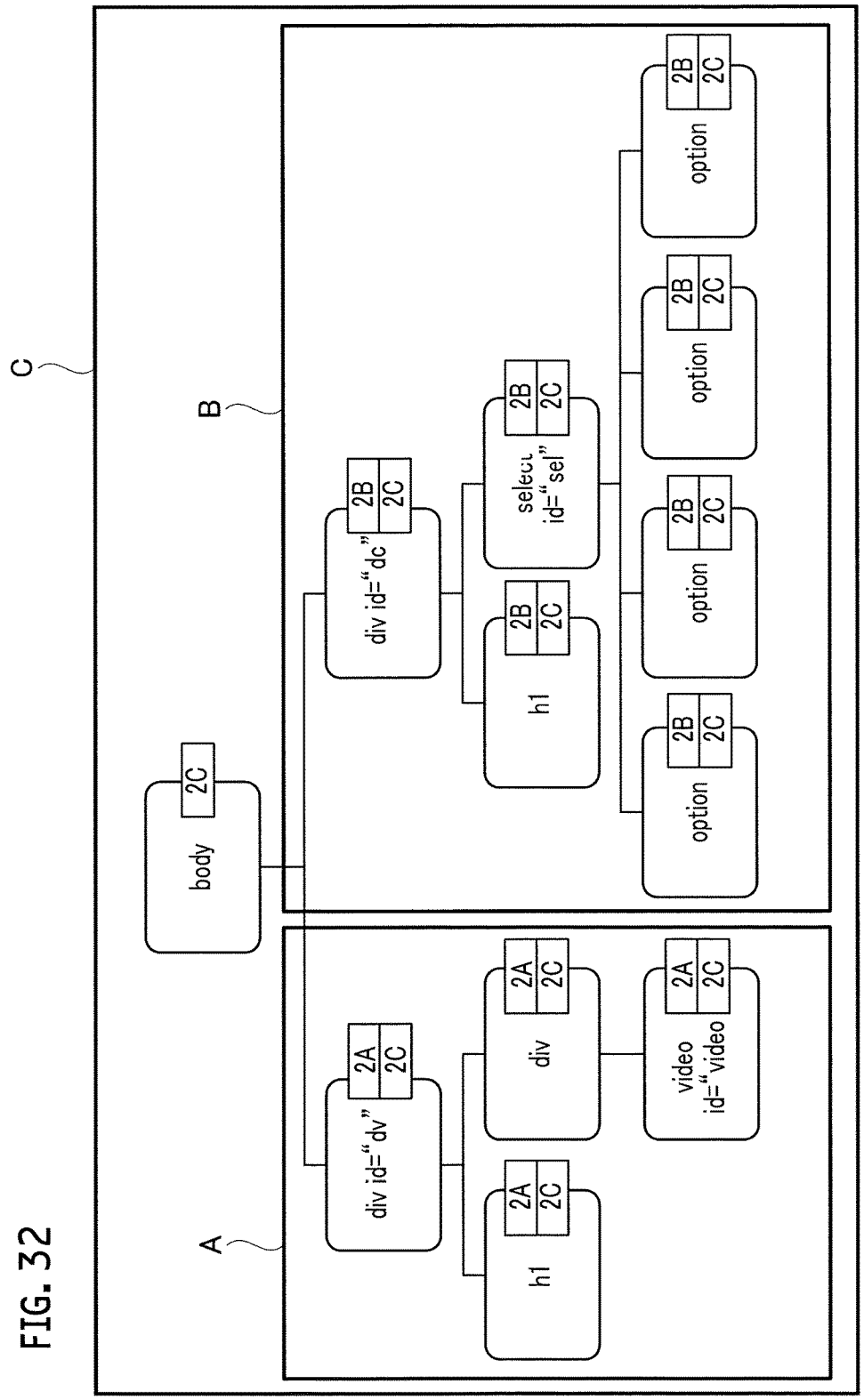
FIG. 32 is a view illustrating arrays which DOM elements include.

FIG. 32 is a view for illustrating arrays which each element includes. In an example of FIG. 32, for the digital content displayed in FIG. 2 and FIG. 3, a sub-tree A having as a root an element whose ID attribute is "dv", a sub-tree B having as a root an element whose ID attribute is "dc", and a sub-tree C having as a root an element whose ID attribute is "body" are assigned to and displayed in a child browser 2A, a child browser 2B, and a child browser 2C, respectively. Frames provided to the side of the elements represent the arrays, and character strings (2A, 2B, 2C) in the frames represent child browser identifiers of the child browsers 2A, 2B, 2C, respectively. In the example of FIG. 32, since the sub-tree A is shared by the child browsers 2A, 2C the arrays of respective elements belonging to the sub-tree A store the child browser identifiers "2A", "2C" of the child browsers 2A, 2C. Similarly, since the sub-tree B is shared by the child browsers 2B, 2C, the arrays of respective elements belonging to the sub-tree B store the child browser identifiers "2B", "2C" of the child browsers 2B, 2C. Since a <body> element is assigned to only the child browser 2C, the array of the <body> element stores only the child browser identifier "2C" of the child browsers 2C.

Processes on the above arrays by the child browser determination unit 13 include three: "assignment", "cancellation", and "reference"

In the "assignment" process, the child browser determination unit 13 receives an element identifier and a child browser identifier as a parameter, and adds a specified child browser identifier (hereinafter referred to as a "specified child browser identifier") to arrays of all elements under an element specified by the element identifier (hereinafter referred to as a "specified element").

In the "cancellation" process, the child browser determination unit 13 receives the element identifier and the child browser identifier as a parameter, and deletes the specified child browser identifier from the arrays of all elements under the specified element.

In the "reference" process, the child browser determination unit 13 receives the element identifier as a parameter and returns a child browser identifier stored in the array of the specified element.

Addition or deletion of the specified child browser identifier to or from the arrays for all elements under the specified element can improve efficiency in the process for the child browser determination unit 13 to determine to which child browser a certain element is assigned.

In addition, the child browser determination unit 13 can implement processes on arrays in such ways of storing the specified child browser identifier only in the array for the specified element, in the "assignment" process; deleting the specified child browser identifier from the array for the specified element, in the "cancellation" process; and collecting and returning child browser identifiers stored in element arrays while following DOM tree-structure data from the specified element towards the root, in the "reference" process.

The above-mentioned processes on the arrays by the child browser determination unit 13 are called when the child browser determination unit 13 determines a DOM sub-tree to be transmitted to the child browser, when JavaScript API specifies an element which is a root of a DOM sub-tree to be transmitted to the child browser, and the like. Specifying with JavaScript API the element which is a root of a DOM sub-tree to be transmitted to the child browser for the child browser determination unit 13 enables construction of a system whereby a system architect determines a correspondence between elements in a DOM and child browsers depending on predetermined conditions or manipulations by system users. As a specific example, an application program for displaying identifiers of child browsers which can be connected and DOM elements stored in the DOM storage unit 12 on the screen, thereby letting a user to decide an element to assign to a child browser or an application program for deciding an element to be assigned depending on the capacity which a child browser has (screen size or a format of motion video which can be displayed, and the like) is constructed. Then, the identifier of the element which is the root of the sub-tree and the child browser identifier are passed to the child browser determination unit 13 to execute the process described above.

In the following, operations on elements shared by a plurality of child browsers are described. In the first embodiment, the DOM API provided by the DOM access unit 15 is described. Here, in the DOM API processes, any different point in the operations on the elements shared by the multiple child browsers is described.

(1) Change to DOM
(2) Change to element attributes
(4) Change to element properties
(6) Call of element methods (when there is no return value)
(7) Event listener registration
(8) Event listener cancellation For the process with no return value as listed above, a request is transmitted to all child browsers stored in arrays for elements to be operated and a same operation is performed on all of the child browsers.

(3) Reference to element attributes
(4) Reference to element properties
(6) Call of element methods (when there is a return value)

For the process with a return value as listed above, one child browser is selected from arrays for elements to be operated and a return value is acquired from elements of the DOM storage unit 23 of the selected child browser. In the following, a process to select a child browser and acquire a return value is described.

Figure 33:
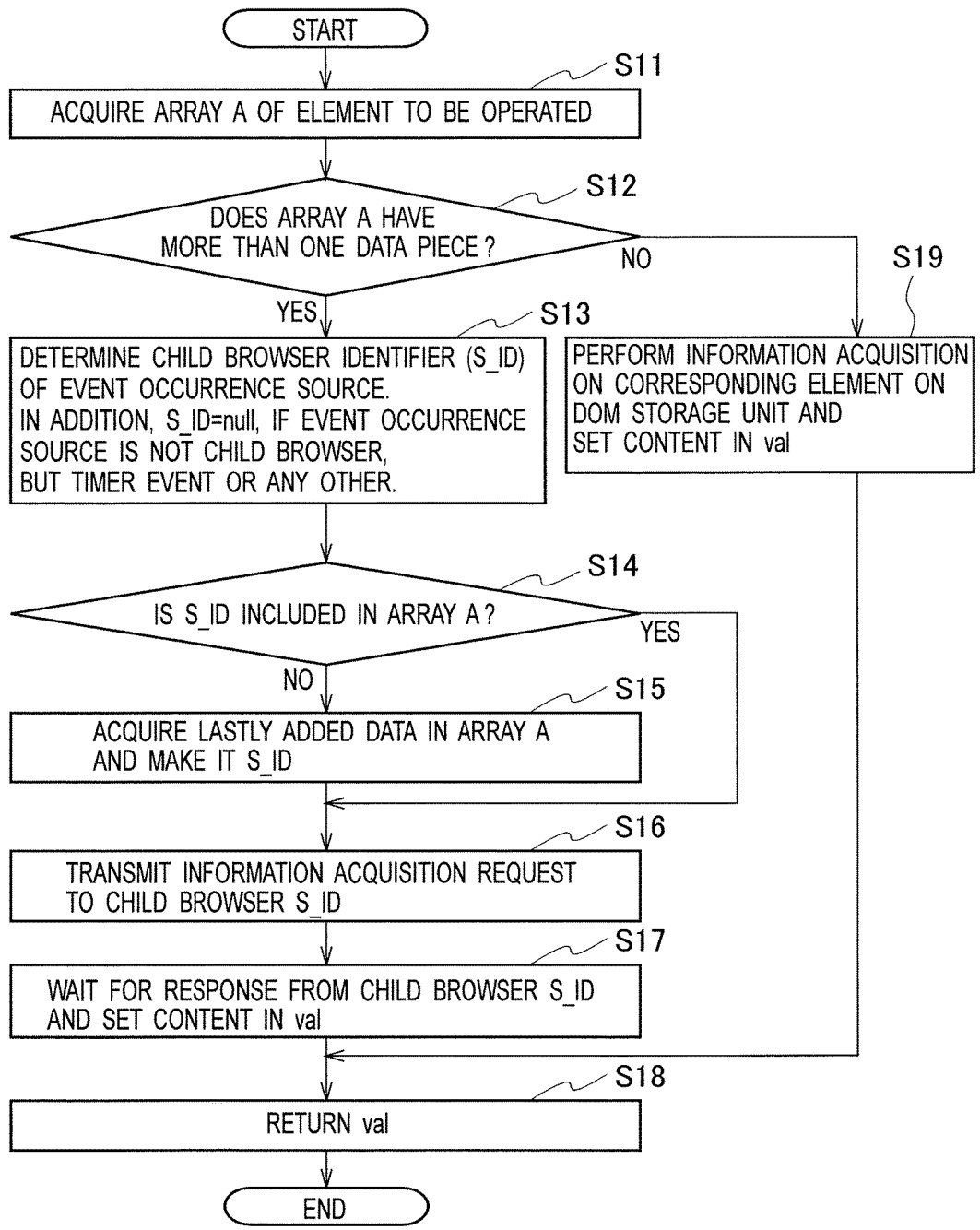
FIG. 33 is a flow chart showing flow of a process for a content display device in a fifth embodiment to acquire a return value from an element.
Figure 34:
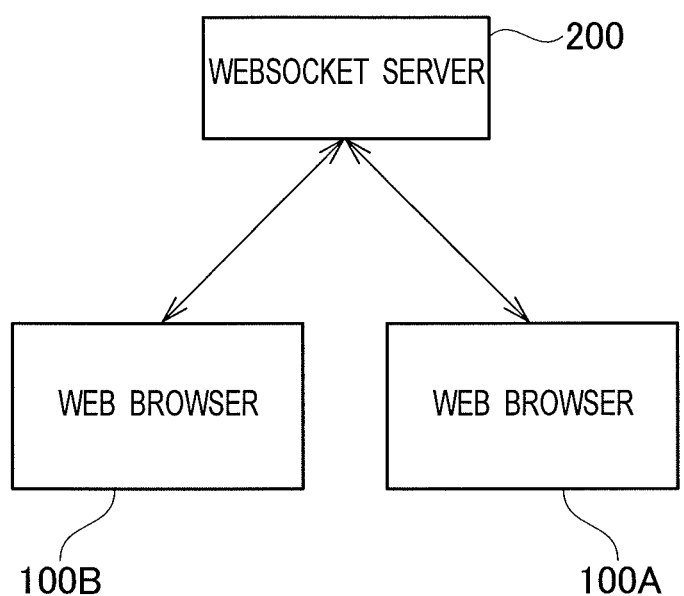
FIG. 34 is a view illustrating a technique of operating conventional Web browsers cooperatively.

FIG. 33 is a flow chart showing flow of the process to select a child browser and acquire a return value.

As a condition to execute the process, the DOM access unit 15 needs to store an identifier of a child browser at an event occurrence source. Specifically, when receiving an event occurrence notice, the child browser communication unit 16 acquires an identifier of the child browser which transmits the event occurrence notice, and notifies the DOM access unit 15 of the occurrence of the event, adding the acquired child browser identifier as a parameter. The DOM access unit 15 causes an event to occur to start a callback function, with the child browser identifier stored in a temporary storage area. When the DOM APIs with a return value of (3), (5), (6) mentioned above are called in the callback function, processes to be described below are executed.

First, an identifier of an element to be operated is passed to the child browser determination unit 13 to acquire an array A of the element to be operated (Step S11), and it is determined whether or not more than one child browser identifier is stored in the array A (step S12).

When no child browser identifier is stored in the array A (No in step S12), the element to be operated is not assigned to any child browser. Thus, information acquisition is performed on the corresponding element on the DOM storage unit 12, the acquired information is set to a return value val (step S19), and the return value val is returned (step S18).

When the child browser identifier is stored in the array A (Yes in step S12), a child browser identifier (S_ID) of an event occurrence source is acquired (step S13). In addition, S_ID=null when the event occurrence source is not a child browser, such as the case triggered by a timer event and the like.

It is determined whether or not S_ID is included in the array A (step S14). When S_ID is not included in the array A, a child browser identifier added to the end of the array A is made S_ID (step S15).

A request for information acquisition is transmitted to the child browser indicated by S_ID (step S16), the content of a response is set in a return value val (step S17), and the return value val is returned (step S18).

When the started callback function ends, the DOM access unit 15 clears the temporary storage area where S_ID is stored. Thus, during processing of an event which is not triggered by the event occurrence notice from the child browser, such as the timer event, the callback function is started with the temporary storage area cleared. Thus, in step S13, S_ID=null is possible.

Note that for DOM APIs provided by the DOM access unit 15, there is no need to change (9) traverse in DOM and (10) event occurrence.

In the following, operations of this embodiment are described with an illustrative example.

First, an operation performed when three child browsers 2A, 2B, 2C are caused to share and display the digital content shown in FIG. 2 and FIG. 3 is described.

It is supposed that with the content display device 1 having read the digital content shown in FIG. 2 and FIG. 3, the child browser 2C implemented as a tablet terminal is connected. The application program determines from the capacity of the child browser 2C (relatively large screen size and input feature capable of touch panel manipulations) that the child browser 2C should display the whole digital content read, and assigns to the child browser 2C a sub-tree C under the <body> element (entire digital content), and an identifier "2C" of the child browser 2C is stored in arrays for all elements belonging to the sub-tree C. Then, the sub-tree C is transmitted to the child browser 2C, and the screen displayed in FIG. 4, specifically, a video display section for displaying video and the select box for selecting video are both displayed on the child browser 2C.

Then, it is supposed that the child browser 2A implemented on a television terminal is connected. The application program determines from the capacity of the child browser 2A (large screen size or limited input feature such as an infrared remote controller and the like) that the child browser 2A should display only the video display section, and assigns to the child browser 2A a sub-tree A having as a root an element whose ID attribute is "dv", and an identifier "2A" of the child browser 2A is stored in arrays for all elements belonging to the sub-tree A. Then, the sub-tree A is transmitted to the child browser 2A, and the screen displayed in FIG. 7, specifically, only the video display section for displaying video is displayed on the child browser 2A. Then, display of the child browser 2C remains unchanged. For users, it looks like that the video display section displayed in the child browser 2C is also shared by the child browser 2A.

In addition, it is supposed that the child browser 2B implemented on a mobile terminal is connected. The application program determines from the capacity of the child browser 2B (small screen size or input feature capable of manipulating a touch panel and the like) that the child browser 2B should display only a video control unit, and assigns to the browser 2B a sub-tree having as a root an element whose ID attribute is "dc", and an identifier "2B" of the child browser 2B is stored in arrays for all elements belonging to the sub-tree B. Then, the sub-tree B is transmitted to the child browser 2B, and the screen displayed in FIG. 8, specifically, only the video control unit is displayed on the child browser 2B. Then, displays of the child browsers 2A, 2C remain unchanged. For users, it looks like that the list box displayed in the child browser 2A is also shared by the child browser 2B.

With the operations described above, a portion of a digital content is shared and displayed in the child browsers 2A, 2B, 2C.

Then, description is provided for an operation performed when a user selects motion video from the list box displayed in the child browser 2C while a digital content is displayed in the child browsers 2A, 2B, 2C as described above.

When the user selects another motion video by manipulating the list box displayed in the child browser 2C, a change event occurs in the child browser 2C, and an event occurrence notice is transmitted to the content display device 1 from the child browser 2C.

When receiving the event occurrence notice, the child browser communication unit 16 notifies the DOM access unit 15 of occurrence of the event together with parameters of the child browser identifier "2C" of the occurrence source, an ID "sel" of a target element, and an event type "change".

The DOM access unit 15 causes the change event to occur in the element which is in the DOM storage unit 12 and whose ID attribute is "sel", with the child browser identifier "2C" of the occurrence source stored in a temporary storage area. With the occurrence of this event, the changeVideo function of FIG. 3 which is registered in the element in the DOM storage unit 12 is started.

In the changeVideo function, a process to acquire a property, selectedIndex, from the element whose ID attribute is "sel" is executed. As shown in FIG. 32, two child browser identifiers (2B, 2C) are stored in an array for the element whose ID attribute is "sel". With the process described through the use of the flow chart in FIG. 33, a request to acquire a value of selectedIndex is transmitted to the child browser 2C indicated by the child browser identifier "2C" which is stored in the temporary storage area of the DOM access unit 15. A response listing the value of selectedIndex selected by the user is returned from the child browser 2C.

Then, a process to set motion video corresponding to selectedIndex in a property, src, of an element whose ID attribute is "video" is executed. As shown in FIG. 32, since the two child browser identifiers (2A, 2C) are stored in an array for the element whose ID attribute is "video", a request to set video motion corresponding to selectedIndex in the src property of the element whose ID attribute is "video" is sent to each of the two child browsers 2A, 2C. Then, in each of the child browsers 2A, 2C, the motion video corresponding to selectedIndex is set in the src property of the element whose ID attribute is "video".

Then, a process to invoke a load method and a play method for the element whose ID attribute is "video" is executed. Also in the process, similar to the above, a request to invoke the load method and the play method for the element whose ID attribute is "video" is transmitted to each of the two child browsers 2A, 2C indicated by the two child browser identifiers (2A, 2C) stored in the array for the element whose ID attribute is "video". With this, the motion video corresponding to selectedIndex selected in the child browser 2A is played in each of the child browsers 2A, 2C.

In addition, when the user manipulates the list box in the child browser 2B, selectedIndex of the child browser 2B is similarly evaluated, the motion video corresponding to selectedIndex which the user selects in the child browser 2B is played in each of the child browsers 2A, 2C.

As described above, when the child browsers 2A, 2C perform display by sharing the video display section and the child browsers 2B, 2C perform display by sharing the list box, irrespective of on which of the child browsers 2B, 2C motion video is selected in the list box, the selection can be reflected in the video display sections of both of the child browsers 2A, 2C. That is to say, not only a digital content is simply shared by a plurality of child browsers, but also operations specified by JavaScript can be shared by the plurality of child browsers. In the content display method of causing a plurality of child browsers to display a digital content in the embodiment described above, the following steps are performed: acquiring content data including a script and expanding the data into tree-structure data; causing each of the plurality of child browsers to not only display a digital content corresponding to the entire tree-structure data or a sub-tree which is a part thereof but also to accept manipulations; and reflecting and executing the manipulation accepted by the at least one of the plurality of child browsers in the at least one of the plurality of child browsers which displays the entire tree-structure data to be manipulated or the sub-tree which is the part thereof are performed.

In addition, when each of the plurality of child browsers accepts a manipulation, a process based on each manipulation accepted is executed in the order of occurrence of manipulations, and an execution result is reflected in a child browser displaying a digital content which is a target of the received manipulation. For example, if motion video is selected in each of the child browsers 2B, 2C when the child browsers 2B, 2C share and display the list box, an event occurrence notice is transmitted to the content display device 1 from the child browsers 2B, 2C. The event occurrence notice may include information on time when the manipulation is accepted (that is to say, information on time when the event occurs).

When receiving the event occurrence notice, the child browser communication unit 16 transmits to the DOM access unit 15 the event occurrence notice in the order of reception of the event occurrence notices or in order of the old time information when the time information is included. The DOM access unit 15 causes an event to occur in the DOM storage unit 12 in the order of reception of event occurrence notices from the child browser communication unit 16. By causing an event to occur in this manner, a function registered in an element in the DOM Storage unit 12 is started in the order of occurrence of manipulations in the child browsers 2B and 2C.

More specifically, if motion video is selected in the list box in the child browser 2C and then motion video is selected in the list box in the child browser 2B, playing of the motion video first selected in the child browser 2C starts in both of the video display sections of the child browsers 2A, 2C. Then, the motion video is switched to the motion video selected in the child browser 2B and playing starts.

EXPLANATION OF THE REFERENCE NUMERALS 1 content display device
11 content acquisition unit
12 DOM storage unit
13 child browser determination unit
14 application script execution unit
15 DOM access unit
16 child browser communication unit
2A, 2B, 2C child browsers
21 reception unit
22 notification unit
23 DOM storage unit
3 browser
31 display unit
100A, 100B Web browsers
200 WebSocket server

The invention claimed is:
1. A content display device comprising:
a processor and a memory, wherein the processor
acquires content data including a script;
expands the content data into tree-structure data and stores the tree-structure data in the memory, wherein the content data is divided into a plurality of elements in the tree-structure data;
determines from the tree-structure data a plurality of sub-trees, each sub-tree corresponding to a portion of the content data to be displayed by one of the plurality of child browsers based on attributes of the plurality of child browsers, wherein each attribute identifies a type of device associated with the respective child browsers and each sub-tree includes a subset of the plurality of elements in the tree-structure data, and transmits each of the sub-trees to the corresponding child browser, wherein the sub-trees configure the corresponding child browsers with different attributes to display different portions of the content data;
requests a first child browser, which is one of the plurality of child browsers, not to display the entire sub-tree or a part of the sub-tree and transmits the entire sub-tree or the part of the sub-tree to a second child browser which is different from the first child browser;
executes the script;
when the processor executes a process to access the tree-structure data, notifies the child browser holding a sub-tree to be accessed of the process and causes the child browser to execute a process, and when an occurrence notice of an event is received from the child browser, executes a process corresponding to the event; and
communicates with the child browsers.

2. The content display device according to claim 1, wherein the processor transmits the entire sub-tree or the part of the sub-tree that has been already transmitted to the first child browser which is one of the plurality of child browsers, to a third child browser which is different from the first child browser.

3. The content display device according to claim 1, wherein
when the processor executes a process to access the tree-structure data, notifies at least one child browser holding a sub-tree to be accessed and causes the child browser to execute a process, and when an occurrence notice of an event is received from any of the child browsers, executes a process corresponding to the event.

4. The content display device according to claim 1, wherein each of the child browsers comprises:
a processor and a memory, wherein the processor:
receives and stores the sub-tree;
displays a screen based on the sub-tree and accepts a manipulation;
receives the notice from the content display device and accesses the sub-tree based on the notice; and
notifies the content display device of an occurrence notice of an event when the event occurs in the sub-tree.

5. A content display method of causing a plurality of child browsers to display portions of a digital content, comprising:
acquiring content data including a script;
expanding the content data into tree-structure data and storing the tree-structure data, wherein the content data is divided into a plurality of elements in the tree-structure data;
determining from the tree-structure data a plurality of sub-trees, each sub-tree corresponding to a portion of the digital content to be displayed by one of the plurality of child browsers based on attributes of the plurality of child browsers, wherein each attribute identifies a type of device associated with the respective child browser and each sub-tree includes a subset of the plurality of elements in the tree-structure data, and transmitting each of the sub-trees to the corresponding child browser, wherein the sub-trees configure the corresponding child browsers with different attributes to display different portions of the content data;
requesting a first child browser, which is one of the plurality of child browsers, not to display the entire sub-tree or a part of the sub-tree and transmits the entire sub-tree or the part of the sub-tree to a second child browser which is different from the first child browser;
executing the script;
when a process to access the tree-structure data is executed in the executing the script, notifying the child browser holding a sub-tree to be accessed of the process, and causing the child browser to execute a process;
executing a process corresponding to an event when an occurrence notice of the event is received from the child browsers; and
communicating with the child browsers.

6. The content display method according to claim 5, further comprising providing a content display method for one of the child browsers, wherein the content display method for the one of the child browsers comprises:
receiving and storing the sub-tree;
displaying a screen based on the sub-tree and accepting a manipulation;
receiving the notice from the content display device and accessing the sub-tree based on the notice; and
notifying the content display device of an occurrence notice of an event when the event occurs in the sub-tree.

7. The content display method according to claim 5 comprising:
displaying, by at least two child browsers of the plurality of child browsers, a digital content based on a sub-tree which is a part of the tree-structure data, and accepting manipulations; and
executing, by the processor, processes based on the accepted manipulations in the order of occurrence of the manipulations, and causing the child browsers displaying the digital content which is a target of the accepted manipulations to reflect execution results.

8. A non-transitory computer-readable storage medium storing a content display program which causes a computer to execute a process comprising:
acquiring content data including a script;
expanding the content data into tree-structure data and storing the tree-structure data, wherein the content data is divided into a plurality of elements in the tree-structure data;
determining from the tree-structure data a plurality of sub-trees, each sub-tree corresponding to a portion of the content data to be displayed by one of the plurality of child browsers based on attributes of the plurality of child browsers, wherein each attribute identifies a type of device associated with the respective child browsers and each sub-tree includes a subset of the plurality of elements in the tree-structure data, and transmitting each of the sub-trees to the corresponding child browser, wherein the sub-trees configure the corresponding child browsers with different attributes to display different portions of the content data;
requesting a first child browser, which is one of the plurality of child browsers, not to display the entire sub-tree or a part of the sub-tree and transmitting the entire sub-tree or the part of the sub-tree to a second child browser which is different from the first child browser
executing the script;
when a process to access the tree-structure data is executed in the executing the script, notifying the child browser holding a sub-tree to be accessed of the process and causing the child browser to execute a process;
executing a process corresponding to the event when an occurrence notice of an event is received from the child browser; and
communicating with the child browsers.

9. The non-transitory computer-readable storage medium according to claim 8 comprising:
transmitting the entire sub-tree or the part of the sub-tree that has been already transmitted to the first child browser which is one of the plurality of child browsers, to a third child browser which is different from the first child browser.

10. The non-transitory computer-readable storage medium according to claim 8 comprising:
when a process to access the tree-structure data is executed in the executing the script, notifying at least one child browser holding a sub-tree to be accessed and causing the child browser to execute a process;
executing a process corresponding to an event when an occurrence notice of the event is received from any of the child browsers.

* * * * *